United States Patent
Shafer et al.

(10) Patent No.: US 6,483,264 B1
(45) Date of Patent: Nov. 19, 2002

(54) AIR CONTROL SYSTEM FOR AN AIR BED

(75) Inventors: David C. Shafer, Menlo Park, CA (US); Eugene P. Duval, Menlo Park, CA (US)

(73) Assignee: Select Comfort Corporation, Minneapolis, MN (US)

( * ) Notice: Subject to any disclaimer, the term of this patent is extended or adjusted under 35 U.S.C. 154(b) by 0 days.

(21) Appl. No.: 09/685,927

(22) Filed: Oct. 10, 2000

Related U.S. Application Data

(63) Continuation of application No. 09/471,592, filed on Dec. 23, 1999, now abandoned, which is a continuation of application No. 09/253,572, filed on Feb. 19, 1999, now Pat. No. 6,037,723, which is a continuation of application No. 08/827,397, filed on Mar. 27, 1997, now Pat. No. 5,903,941, which is a division of application No. 08/536,330, filed on Sep. 29, 1995, now Pat. No. 5,652,484, which is a continuation-in-part of application No. 08/332,833, filed on Nov. 1, 1994, now Pat. No. 5,509,154.

(51) Int. Cl.[7] ............................................. A47C 27/10
(52) U.S. Cl. .................. 318/16; 5/935; 5/713
(58) Field of Search ......................... 318/16, 480, 481; 5/706, 713, 935

(56) References Cited

U.S. PATENT DOCUMENTS

| | | | | |
|---|---|---|---|---|
| 4,829,616 A | * | 5/1989 | Walker | 5/453 |
| 4,882,566 A | * | 11/1989 | Koerber, Sr. et al. | 340/825.69 |
| 5,020,176 A | * | 6/1991 | Dotson | 5/453 |
| 5,051,673 A | * | 9/1991 | Goodwin | 318/481 |
| 5,062,171 A | * | 11/1991 | Vrzalik | 5/455 |
| 5,235,258 A | * | 8/1993 | Schuerch | 318/16 |

* cited by examiner

Primary Examiner—Bentsu Ro
(74) Attorney, Agent, or Firm—Oppenheimer Wolff & Donnelly LLP

(57) ABSTRACT

An automatic control system for controlling the firmness of a fluid supported mattress of a bed assembly. The control system includes a motorized fluid pump, a control unit for operating the pump to adjust the firmness of the air mattress, a hand held remote control unit for actuating the control unit, and a transceiver system for transmitting information signals between the hand held unit and the control unit. The air control system provides for independent control of both bladders in a two bladder air mattress from a single unit, and allows a user to consistently set the firmness of each mattress air bladder to a desired value. The air control system includes an air pump specially designed to minimize transmission of motor noise into the environment.

11 Claims, 18 Drawing Sheets

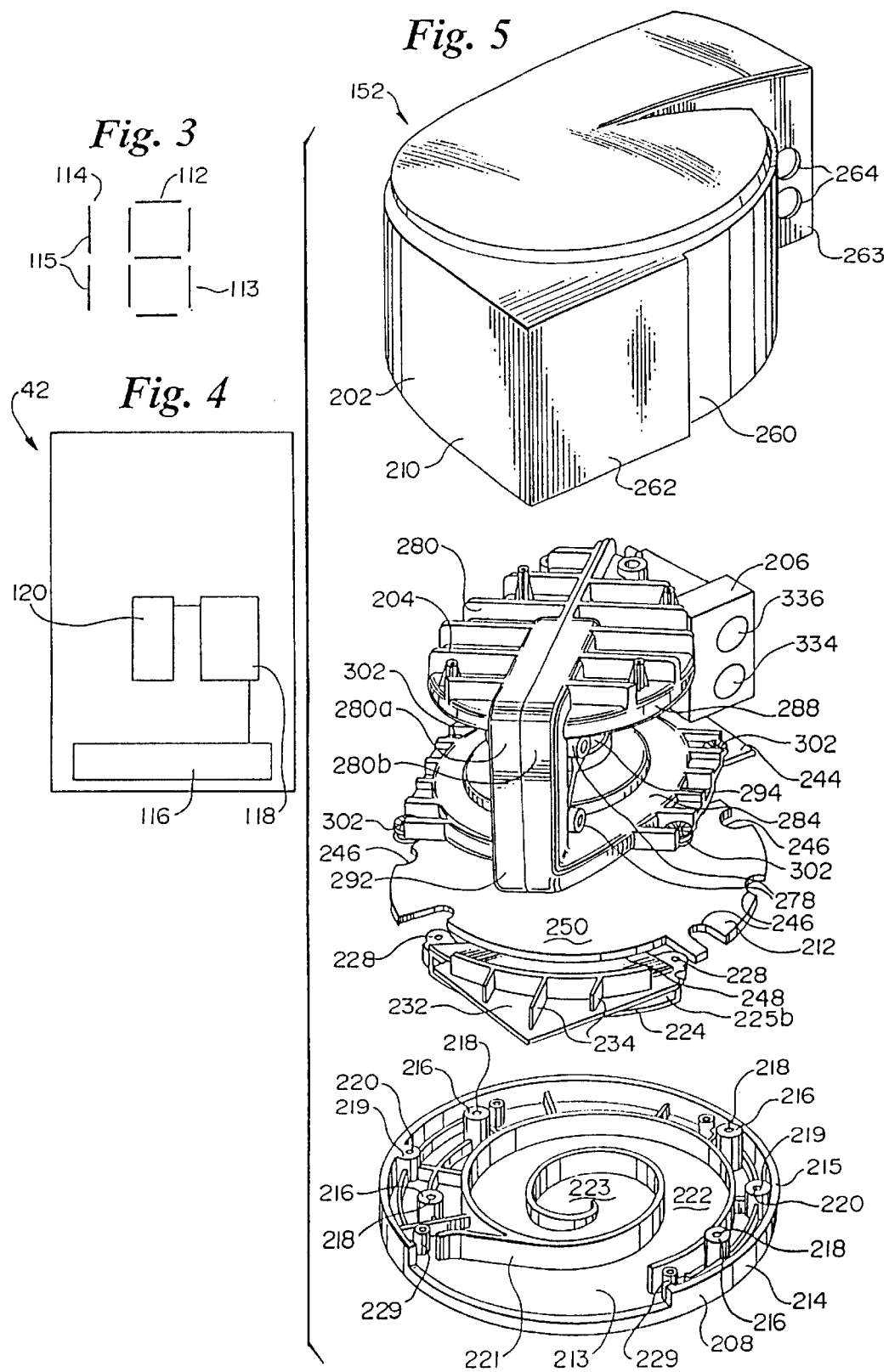

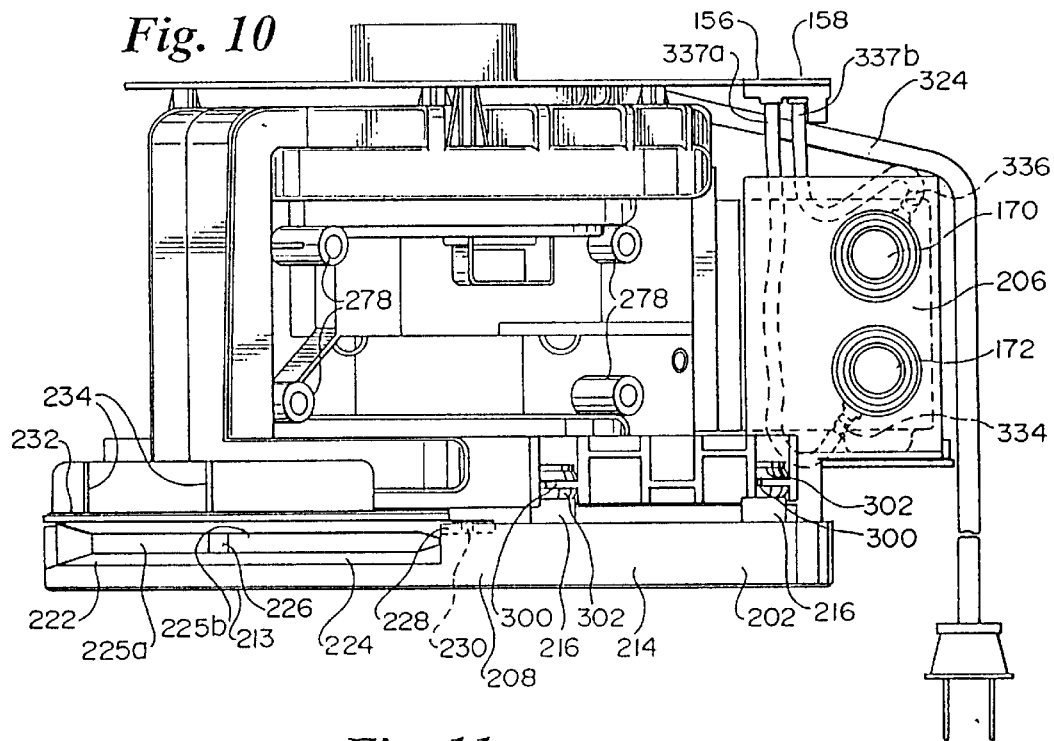
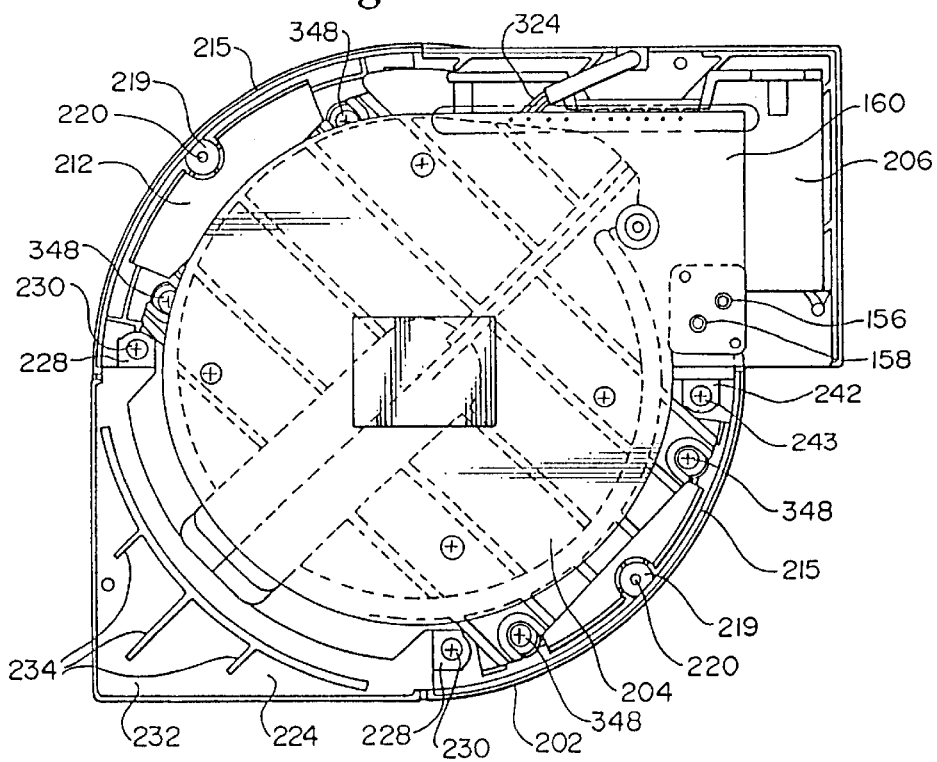

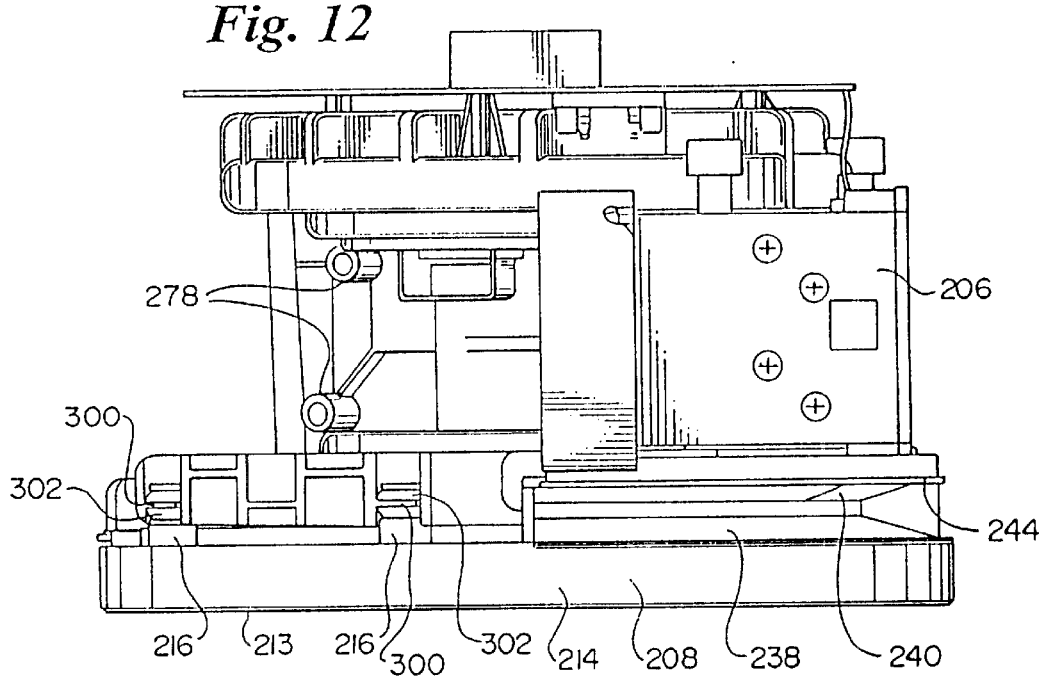
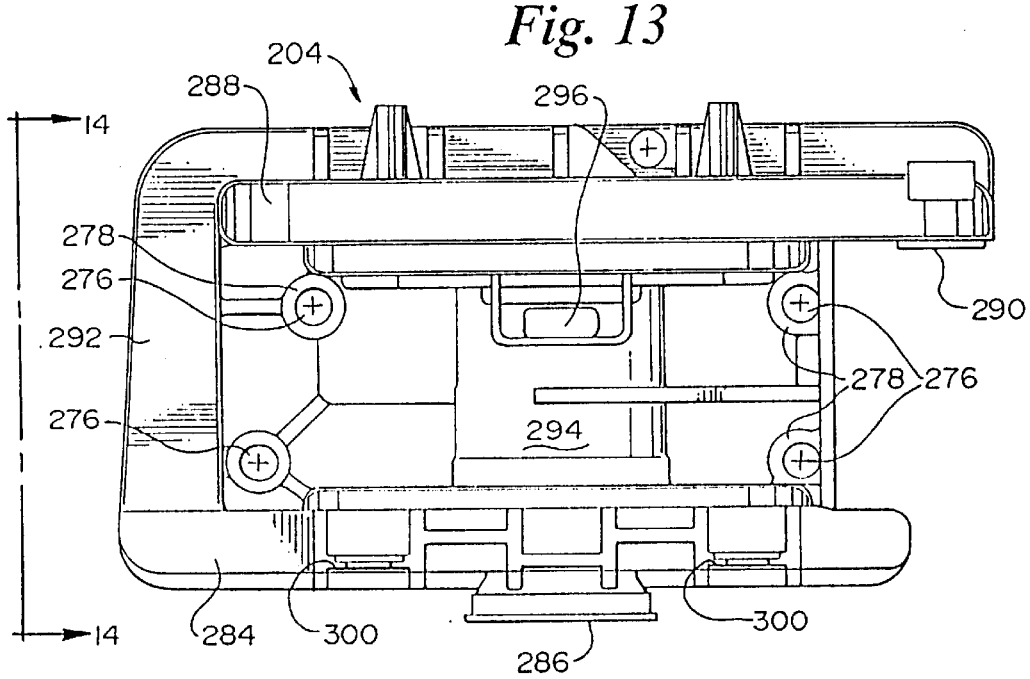

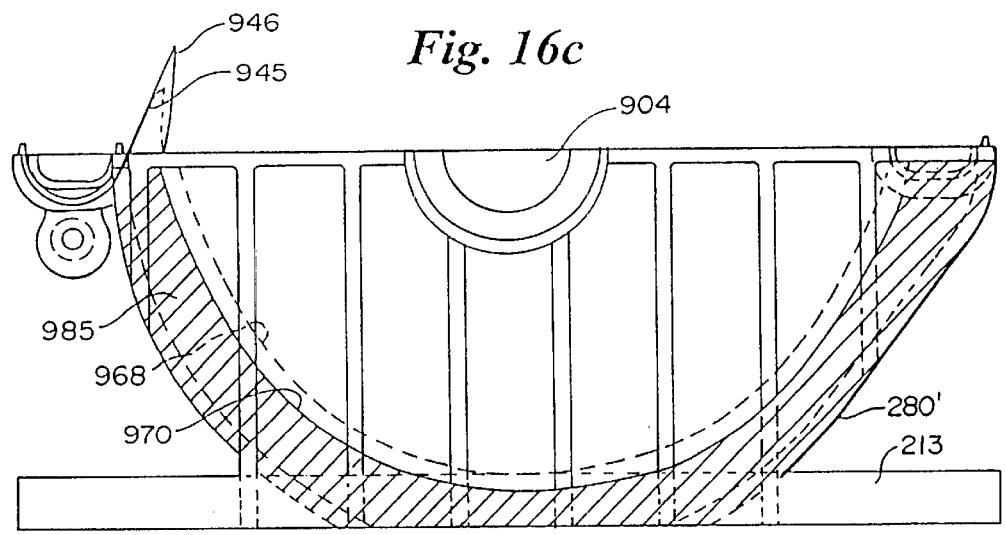
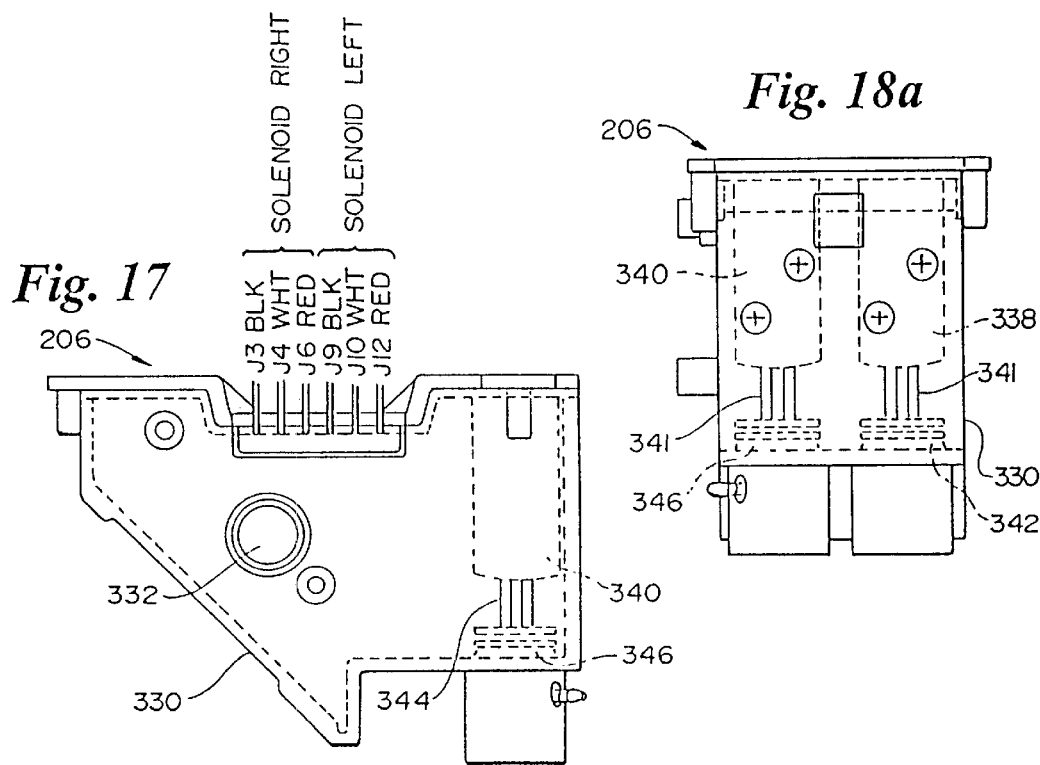

AIR CONTROL SYSTEM FOR AN AIR BED

This is a Continuation application, under 37 C.F.R. §1.53(b), of application Ser. No. 09/471,592, filed Dec. 23, 1999 for: AIR CONTROL SYSTEM FOR AN AIR BED by: David C. Shafer and Eugene P. Duval, now abandoned; which was a Continuation of application Ser. No. 09/253,572, filed Feb. 19, 1999 for: AIR CONTROL SYSTEM FOR AN AIR BED by: David C. Shafer and Eugene P. Duval, now U.S. Pat. No. 6,037,723; which was a Continuation of application Ser. No. 08/827,397, filed Mar. 27, 1997 for: AIR CONTROL SYSTEM FOR AN AIR BED by: David C. Shafer and Eugene P. Duval, now U.S. Pat. No. 5,903,941; which was a Divisional application of application Ser. No. 08/536,330, filed Sep. 29, 1995 for: AIR CONTROL SYSTEM FOR AN AIR BED by: David C. Shafer and Eugene P. Duval, now U.S. Pat. No. 5,652,484; which was a Continuation-In-Part of application Ser. No. 08/332,833, filed Nov. 1, 1994 for: AIR CONTROL SYSTEM FOR AN AIR BED by: David C. Shafer and Eugene P. Duval, now U.S. Pat. No. 5,509,154. The entire disclosure of the prior applications are considered as being part of the disclosure of the accompanying application and are hereby incorporated by reference therein.

TECHNICAL FIELD

This invention relates to improved methods and apparatus for attaining and regulating the fluid pressure in one or more fluid accommodating structures. More particularly, the invention relates to improved air pumps, controllers, information processing and hand controls for measuring and varying the air pressure in an air mattress.

BACKGROUND OF THE INVENTION

Air supported mattresses are used with cots and beds to provide yieldable body supports. The air mattresses can be inflated with hand operated pumps or bag pumps. Motor driven blowers and pumps have also been used more effectively to supply air under pressure to air mattresses. U.S. Pat. Nos. 4,908,895 and 4,644,597, assigned to the assignee of the present invention, describe possible constructions of air mattresses.

The air mattresses will typically sit within a border which supports the mattress such as that described in U.S. Pat. No. 4,991,244, also assigned to the assignee of the present invention. Double, queen or king size beds can involve two air mattresses or two air chambers with individually adjustable air pressures. These air chambers may be further divided internally with free fluid flow between these further divisions. The air mattresses can be equipped with a one-way air pressure relief valve operable to limit the air pressure in the air mattress to about 1 psig (pounds per square inch gauge, i.e., relative to ambient pressure) to prevent seam separation and blowout.

The biasing or firmness characteristics of an air mattress are determined by the pressure of the air in the air mattress. Control mechanisms have been used to adjust the inflation of air mattresses. Young et al. in U.S. Pat. No. 4,224,706, for instance, disclose a mechanism for adjusting the amount of air in an air mattress. The mechanism disclosed in the '706 patent includes one or more receptacles connected to air mattresses for supplying air to and receiving air from the air mattresses. These receptacles are located in the frame below the mattress. The internal volumes of the receptacles are changed by the rotation of a hand crank. The variation of the volume in the receptacles adjusts the pressure of the air in the air mattresses.

Other control systems for air mattresses have allowed operators to vary the air pressure within the mattress at the touch of a button. The hand control units in these systems were either located on the air tube connecting the pump to the mattress or the hand control units made an electrical connection to the pump and solenoid valves. See, for example, U.S. Pat. Nos. 4,897,890, 4,829,616, 4,890,344, also assigned to the assignee of the present invention.

These hand control units typically allowed for the transmittance of two instructions to the pump/control unit. These instructions were either to increase or to decrease the pressure. The users had to rely on their tactile senses in adjusting the air pressure because the units supplied no information to the user regarding the pressure in the mattress.

One previous design of pressure control for an air mattress involved keeping the air pressure constant at all times whether the user was on the mattress or not. See U.S. Pat. Nos. 5,142,717 and 4,995,124. A control unit allowed for a preset pressure to be set. One problem with this arrangement was the dramatic change in pressure at the time a user applied weight to the mattress. The air mattress had to have an internal structure to support much of the users weight in order to prevent the escape of large volumes of air while regulating the pressure at the previously set value. The internal structure interfered with the comfort advantages of having an air supported mattress.

Another design of a pressure control unit provided a digital display of the internal pressure and push buttons. See U.S. Pat. No. 5,020,176. The user could either use a constant pressure mode where the pressure could be set by the user. The user also had the option of using a manual mode where the pressure was not kept constant but where the user directly controlled the flow of fluid into or out from the mattress.

In these previous designs, if the bed contained two separate mattresses or air bladders, two hand control units were supplied with each controlling its respective air bladder. Therefore, a person lying on one side of the bed could not assist their bed partner on the other side of the bed with an adjustment of the air pressure on the other side of the bed without physically going to that side of the bed. The hand control units were physically attached to the control unit, thereby restricting the location of a particular unit.

The processing involved in these earlier control systems for air beds was minimal. The constant pressure systems involved a periodic examination of the pressure and a comparison with the desired value. Air was then added or removed as needed with several steps used if needed to obtain the desired pressure. In the manual control designs, the operator directly controlled the pump and the release valve to control the flow of fluid into or out of the mattress.

Electric motor driven pumps have been used in the past to inflate air mattresses. The operating noise of such pumps was a common source of consumer complaints. The pumps were most frequently utilized when the bed user was preparing to go to sleep. A noisy pump detracted from the restful atmosphere necessary to induce sleep. The most frequent cause of noisy operation of such pumps is the rigid mounting of the fan motor to the pump housing. Such rigid mounting transmits vibrations and noises generated by the pump motor to the pump housing and to the environment around the pump. Further avenues of noise transmission to the environment in air pumps are the supply air inlet and the cooling air inlet. Sound insulating and dampening materials could be built into the pump motors and housings, but only at the risk of thermal insulation and resultant over heating of the pump motors.

It would be an advantage in the industry to provide a quiet pump in which the noise and vibration of the fan motor is dampened with respect to the pump housing and wherein adequate cooling of the pump motor was provided for. Further, the air inlet and cooling air inlet should be designed to minimize the amount of fan noise transmitted therethrough. It would be an important advance to provide a multi-speed motor to provide for optimal pumping with less noise and with a minimum of overheating problems. With respect to the control of the units, it would be a distinct advantage to have hand control units where the user of the unit was not tethered to the pump unit, and where the user could control both air bladders in the case where each side of the bed had its own independent bladder. It would also be a decided advance in the art to be able to accurately and consistently monitor and control the pressure of the air mattress to a desired setting.

SUMMARY OF THE INVENTION

The air control system of an air bed in accordance with the present invention in large part solves the problems outlined above. The air control system hereof includes a motorized pump specially designed to reduce noise, and includes a remotely operated hand held control unit untethered from the air pump. The user of a bed assembly controlled by the air control system hereof can accurately and consistently adjust the firmness of the air mattress to a desired setting. The remote hand control unit in accordance with the air control system of the present invention allows the user to set the firmness of both bladders in a double bladder air mattress independently of each other.

The hand held control unit communicates with the base unit by way of a radio transceiver. The base unit monitors and transmits to the hand held unit a measure of the air mattress firmness, and responds to commands from the hand held unit to change the firmness of the mattress.

The motorized pump is capable of operating at several speeds to minimize noise while optimizing pumping conditions. The motor speeds can be stepped through a predetermined manner to obtain optimum motor speed while at the same time monitoring motor temperature to prevent overheating. The base unit is specially designed to prevent transmission of undue motor noise from the base unit into the surrounding environment. Microprocessors in both the hand held control and the base unit allow for the optimization of pumping conditions without interaction of the user beyond selection of a desired firmness.

BRIEF DESCRIPTION OF THE DRAWINGS

FIG. 3 is an expanded view of one digit and the half digit of the display of the hand control unit;

FIG. 4 is a schematic view of the inside of the hand control unit;

FIG. 5 is an exploded view of the base unit of the air control system;

FIG. 10 is a side elevational view of the fan unit and air distribution unit mounted on the lower housing portion of the air pump housing;

FIG. 11 is a top plan view of the fan unit and air distribution unit mounted on the lower housing portion of the air pump housing;

FIG. 12 is an elevational view, taken from the right side as depicted in FIG. 4, of the fan unit and air distribution unit mounted on the lower housing portion of the air pump housing;

FIG. 13 is a side elevational view of the fan unit;

FIG. 16C is a schematic partial section view of a re-oriented pump housing and base with improved air routing means;

FIG. 17 is a top plan view of the air distribution unit with the right solenoid valve shown in phantom;

FIG. 18A is a side elevational view of the air distribution unit with the right and left solenoid valves shown in phantom;

DETAILED DESCRIPTION OF THE INVENTION

Figure 1:
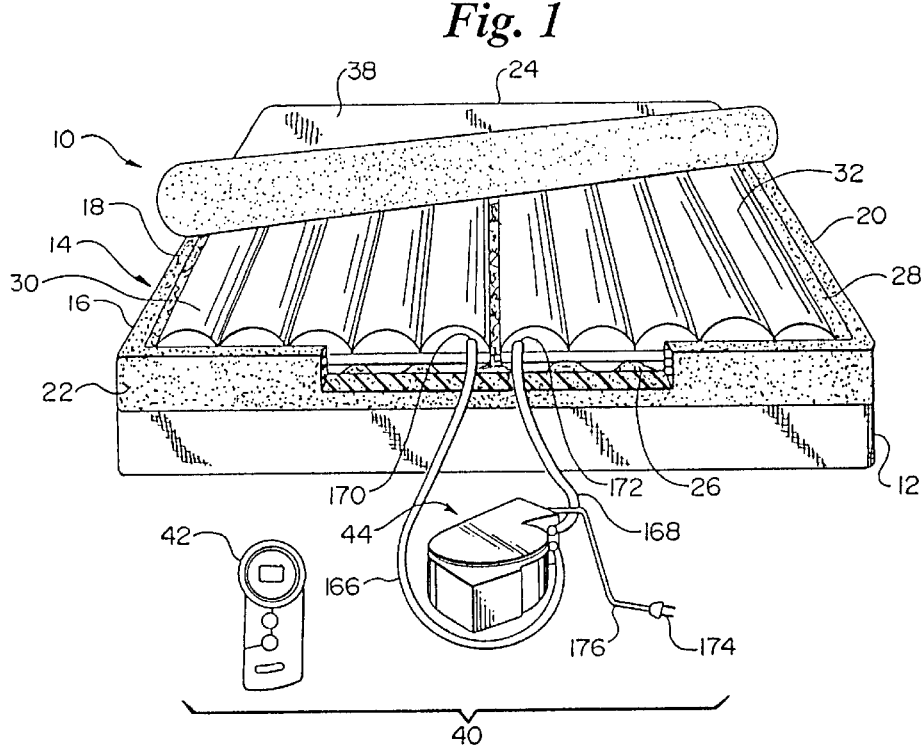
FIG. 1 is a perspective view of an air bed, partly in section, depicted in conjunction with an air control system in accordance with the present invention.

FIG. 1 contains a view of a resilient support 10 in conjunction with an air control system in accordance with the present invention. Resilient support 10 is preferably a fluid filled bed and more preferably an air bed to accommodate one or more persons. Resilient support 10 has a generally rectangular base or box spring unit 12 adapted to be supported on a floor or a frame engaging the floor. A mattress unit 14 is located on top of box spring unit 12. Mattress unit 14 has a generally panshaped resilient member 16 having upright linear side edges 18 and 20 joined to a transverse front edge 22 and a comparable transverse rear edge 24.

Side edges 18, 20, front edge 22 and the rear edge 24 are integral with the peripheral portions of a generally flat bottom 26 to form therewith a generally rectangular chamber 28. A pair of side by side longitudinal air bladders 30 and 32 are located in rectangular chamber 28. The air bladders 30 and 32 comprise air mattresses or air bags that can include a plurality of transverse and/or longitudinal chambers adapted to accommodate air under pressure. The air bladders 30 and 32 are of a size to fill rectangular chamber 28. Commercially available air bladders vary in size from 23 to 34 inches wide and 67 to 84 inches long. Preferably, the air bladders 30, 32 have an inflated thickness of 5.5 inches. Other types and sizes of air bladders as well as bladders designed to accept other fluids, e.g. water, can be used in mattress unit 14 for resilient support 10.

A generally rectangular cover 38 fits over edges 18, 20, 22 and the rear edge 24 to enclose the top of chamber 28. As shown in FIG. 1, a portion of the cover 38 has been rolled back to illustrate the side-by-side placement of air bladders 30, 32 in rectangular chamber 28.

The air control system 40, in accordance with the present invention, functions to provide air under pressure to air bladders 30, 32 and to control the pressure of the air bladders 30, 32. The air control system 40 includes a hand control unit 42 and a base unit 44.

Hand Control Unit Embodiments

Figure 2A:
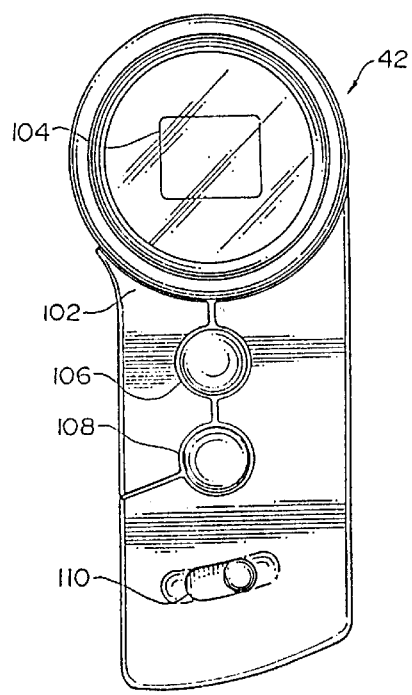
FIG. 2A is a plan view of a hand control unit of the air control system.
Figure 2B:
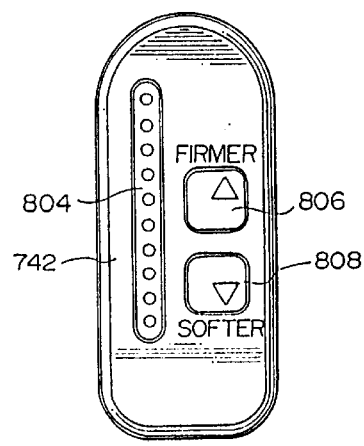
FIG. 2B is a plan view of a hand control unit of the air control system.

Hand control unit 42 shown in FIG. 2A is preferably a remote unit physically unconnected to the remainder of the air control system 40. FIG. 2B shows an alternate embodiment hand control unit 742, which comprises an analog pressure gage indicator 804, and air control buttons 806, 808. Hand control unit 742 is preferably used with the alternate pump configuration described in relation to FIG. 16B, although it is useful with various pump configurations.

The hand control unit 42 allows a user to control the air pressure within the air bladders 30, 32 while lying on the mattress unit 14 or in any other position in the vicinity of the air control system 40. Hand control unit 42 is preferably used with pump 152 described later below, although it is useful with various pump configurations.

The top surface 102 of hand control unit 42 contains a digital display 104, two buttons 106, 108, and a two position switch 110. Digital display 104 presents information received from the base unit 44. Preferably, the digital display 104 is made up of a liquid crystal display (LCD). The LCD is made up of two digits 112 ranging from 0–9 and a half digit that can only be a 1 or unilluminated. In this preferred embodiment, each digit 112 is made up of 7 segments 113, as shown in FIG. 3, and the half digit 114 is made up of two segments 115, the top and bottom of the 1. The liquid crystal display is backlit by two preferably amber light emitting diodes. Digital display 104 displays for the user a number related to the pressure within the air bladders 30, 32. Preferably, the button (either 106 or 108) which is designed to increase the pressure in an air bladder has a protruding top portion as felt by the user, while that button designed for deflating or reducing air pressure in an air bladder is designed with a depressed top portion as felt by a user. This further optimizes the ergonomics of the hand control unit and facilitates use without even viewing the unit.

The two buttons 106, 108 and the switch 110 provides for the communication of a command from the user to the air control system 40. The two buttons 106, 108 are adapted to be used by the user to initiate an inflation or deflation cycle, request the display of the number related to the current pressure or to instruct the base unit 44 to recognize the hand control units 42.

The position of two position switch 110 selects the air bladder 30, 32 on which the operations of the hand control unit 42 will function. The top surface 102 of the hand control unit 42 can include markings indicating left or right near the corresponding side of switch 110. The preferred convention for determining the left/right side of mattress unit 14 is from the perspective of a person laying on their back with their head in the proximity to the front edge 22 (hose side) of the mattress unit 14, although other conventions can be used. For a system having a single air bladder 30, either position of the switch 110 will allow adjustment of the pressure in the air bladder 30 if a Y-hose is used to attach the base unit 42 to the mattress unit 14, as described below.

Referring to FIG. 4, the interior of the hand control unit 44 contains a portable power supply 116, a hand control processor 118 and a hand control receiver/transmitter 120. The portable power supply 116 is made up of a disposable battery or a rechargeable battery. The hand control processor 118 receives input from buttons 106, 108 and base unit 44 through hand control receiver/transmitter 120 and sends output to digital display 104 and base unit 44. The hand control processor 118 is a digital processor, for example a Motorola MC68HC05P4 microcontroller with a little more than 4 Kbytes of ROM (program) memory, 176 bytes of RAM memory, 20 I/O port pins, 1 input-only port pin, 1 timer output pin, and a 16-bit capture/compare timer. The software for the hand control processor 118 is stored in the ROM memory during fabrication. The hand control processor 118 is permanently encoded at manufacture with an eight bit unit ID code and a four bit revision code for the software version by the selection of appropriate resisters within the hand control unit 42. Hand control receiver/transmitter 120 is adjusted to a proper electromagnetic frequency to receive from and transmit to base unit 44. The hand control receiver/transmitter 120 can receive radio signals or transmit radio signals, but it cannot transmit and receive at the same time.

Base Unit Embodiments

Figure 6:
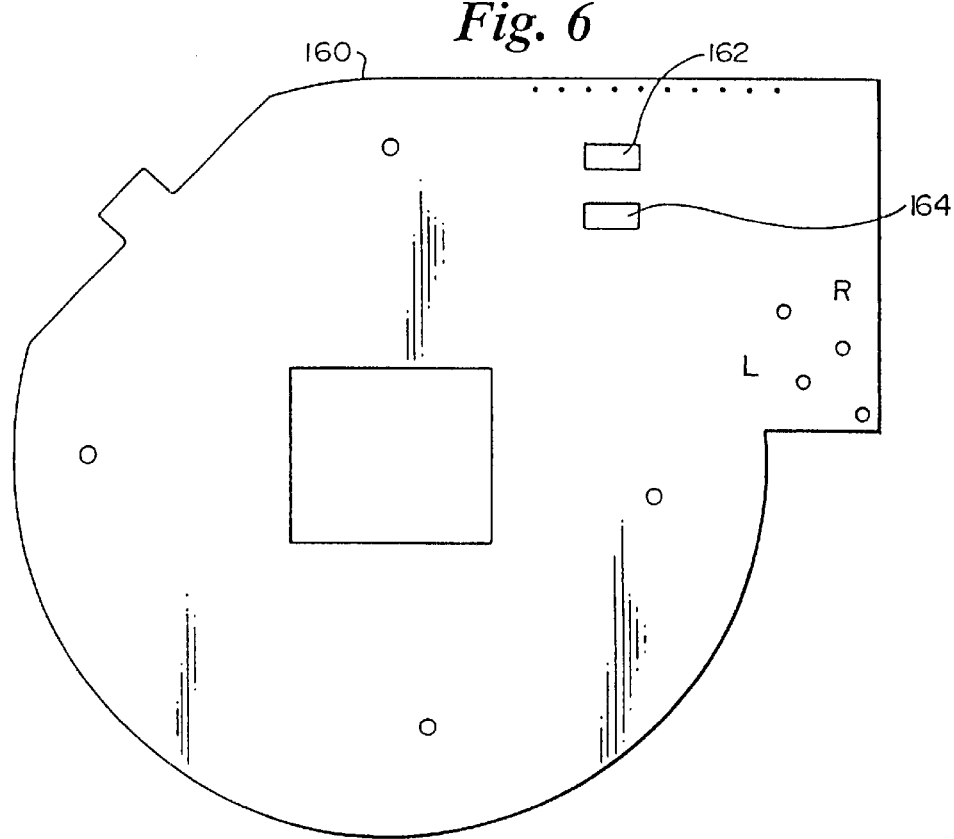
FIG. 6 is a top plan view of the base unit processor board with a schematic representation of the base processor and the base receiver/transmitter.

The base unit 44 of the present invention is depicted in FIG. 5. The base unit 44 contains a motorized pump 152, pressure sensors 156, 158 (FIG. 10), and a base unit processing board 160 (FIG. 11). Referring to FIG. 6, the base processing board 160 contains the base processor 162 and the base receiver/transmitter 164. The base unit 44 is connected to air bladders 30, 32 by way of flexible tubular lines or tubes 166, 168 through inlet receptacles 170, 172. Tubes 166, 168 allow the air control system 40 to place additional air or to remove air from the air bladders 30, 32 to achieve a desired air pressure within the air bladders 30, 32. For a single air bladder 30 mattress unit 14, tubes 166, 168 can be replaced with a Y-shaped tube (not shown) so either the right or left side commands will effect the single air bladder 30 or, alternatively, the unused inlet receptacle 170, 172 can be plugged. An electrical plug 174 is designed to be connected to a conventional alternating current power receptacle. An electrical power cord 176 connects plug 174 to base unit 44.

The base receiver/transmitter 164 is tuned to an electromagnetic frequency that is preferably selected to be in the radio frequency range. The electromagnetic frequency is preferably within the range from 315 MHz ($10^6$ Hz) to 350 MHz. The selection of the radio frequency part of the electromagnetic spectrum enables the clear transmission of the signal without the need for the user to point the hand control unit 42 at the base receiver/transmitter 164. The signal is transmitted in digital form at the rate of 833 bits per second. The base receiver/transmitter 164 can receive radio signals or transmit radio signals, but it cannot transmit and receive at the same time.

The pressure sensors 156, 158 are standard piezoelectric pressure sensors such as those available from IC Sensors Inc. The cap on the pressure sensors 156, 158 contain a small hole to allow air under ambient pressure to enter. This allows the measurement of the variation from ambient pressure by the pressure sensors 156, 158. The circuitry to amplify the signal from the piezoelectric sensor and to perform the analog to digital conversion is also standard in the art.

The processor 162 is a digital processor, for example Motorola MC68HC05P6 microcontroller with a little more than 4 Kbytes of ROM (program) memory, 176 bytes of RAM memory, 20 I/O port pins, 1 input-only port pin, 8-bit analog to digital converter, and a 16-bit capture/compare timer. The software for the processor 162 is stored in the ROM memory during fabrication.

Figure 7:
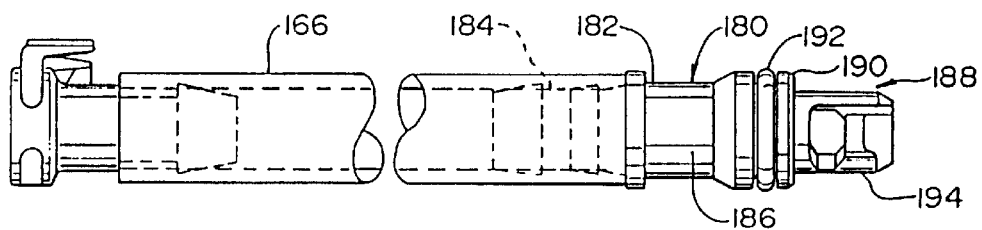
FIG. 7 is a side view of a tube and hose fitting that is used to attach an air mattress to the base unit.
Figure 8:
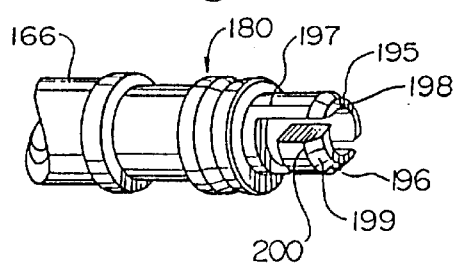
FIG. 8 is a perspective view of the hose fitting that connects to a receptacle in the base unit.
Figure 9:
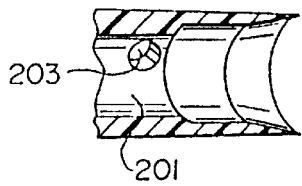
FIG. 9 is a cross sectional view of a receptacle in the base unit which accepts the hose fitting of FIG. 8.

Referring to FIGS. 7, 8 and 9, tube 166 is shown in conjunction with a tube fitting 180. Tube fitting 180 is selectively, detachably received within an inlet receptacle 170, 172, it being understood that the tube 168 is identical in construction with tube 166. Fitting 180 is preferably comprised of a one piece, synthetic resin, generally tubular body 182. The fitting body 182 includes a tube receiving end 184, a body midportion 186, and male connector head 188.

The male connector head 188 includes an enlarged sealing portion 190. The sealing portion 190 carries a sealing o-ring 192. Connector head 188 also includes connecting tip 194. Connecting tip 194 includes a pair of generally semi-circular in cross section prongs 195, 196. The prongs 195, 196 are arranged on the tip 194 in mirror image fashion. Each of the prongs 195, 196 include an axial portion 197 extending outwardly from the enlarged portion 190 of the connector head 188, and a half-circumferential portion 198 arranged in generally L-shaped fashion with the axial portion 197. Circumferential portion 198 includes beveled perimeter 199, and a projecting boss portion 200.

Referring to FIG. 9, each of the inlet receptacles 170, 172 include a generally tubular inner wall 201, and a boss receiving aperture 203. A connector head 188 of a respective hose fitting 180 is detachably received within a respective receptacle 170, 172, with the sealing O-ring 192 carried by the enlarged portion 190 of the connector head 188 received in sealing contact with the receptacle internal side wall 201. A boss 200 of one of the two connecting head prongs 196, 197 is detachably received within the aperture 203.

Pump 152 has three major subcomponents: pump outer housing 202, fan unit 204, and air distribution unit 206.

Pump outer housing 202 has three subcomponents: lower outer housing portion 208, upper outer housing portion 210, and flexible mount 212. Generally, the lower outer housing portion 208 provides the mounting base for the fan unit 204 and the upper outer housing portion 210. The upper outer housing portion 210 is mated to the lower outer housing portion 208, enclosing the fan unit 204 without physical contact therewith. Since the upper outer housing portion 210 of pump outer housing 202 is not in contact with the motor unit 204, mechanical dampening of the fan unit 204 is required only between the fan unit 204 and the lower outer housing portion 208 to which the fan unit 204 is mounted in order to minimize vibration and noise transmission.

Referring to FIGS. 5, 10 and 11, the lower outer housing portion 208 is comprised of a base 213 and peripheral lip 214. Lower outer housing portion 208 is preferably made of a thermoplastic material. The base 213 is designed to be generally flat in order to facilitate being placed upon the floor proximate to the air bed. The peripheral lip 214 has an upper margin into which interlocking marginal grooves 215 are formed.

Four upwardly directed support posts 216 for fan unit 204 are formed integral with base 213. The support posts 216 project above the upper margin of the peripheral lip 214. The support posts 216 have a central bore 218 defined therein to facilitate the passage of a connecting screw therethrough. Smaller connecting posts 219 are also formed integral to base 213. Connecting posts 219 are designed to facilitate the connection of the upper outer housing portion 210 to lower outer housing portion 208. A central bore 220 is defined in connecting posts 219 in order to facilitate passage of a connecting screw therethrough.

A helical wall 221 is formed integral with base 213. Helical wall 221 defines a portion of helical air intake passageway 222. Helical air intake passageway 222 extends from central chamber 223 outward to intake mouth 224. Helical air intake passageway 222 is defined by base 213, helical wall 221, and flexible mount 212.

The intake mouth 224 has two adjacent intake openings 225a and 225b, separated by a central support 226. Support tabs 228 overlie supporting structure 229 formed in base 213. Screws 230 are threaded through bores formed in support tabs 228 and then threaded into the supporting structure formed in base 213 to affix intake mouth 224 to lower outer housing portion 208.

A nose plate 232 projects from and overlies intake openings 225a and 225b. The nose plate 232 is strengthened by gussets 234.

A cooling air mouth 238, depicted in FIG. 12, is also affixed to lower outer housing portion 208 of pump outer housing 202. The cooling air mouth 238 is generally located diametrically opposed to the intake mouth 224.

Cooling air mouth 238 has a cooling air intake 240 defined therein. The cooling air mouth 238 is affixed to base 213 as previously described by means of support tabs 242 and screws 243. A sealing plate 244 projects from and overlies the cooling air intake 240.

The flexible mount 212 is placed atop base 213 of lower outer housing portion 208. The central underside position of flexible mount 212 is supported upon the top portion of helical wall 221.

Flexible mount 212 has a central aperture defined therein. The central aperture 244 is in registry with central chamber 223 of helical air intake passageway 222. Cutouts 246 are provided in flexible mount 212 to accommodate the passage of support posts 216 therethrough.

Flexible mount 212 is formed of a relatively thin lower flexible rubber portion 248 and an upwardly directed relatively thick foam rubber cushion 250. The foam rubber cushion 250 is preferably bonded to flexible rubber portion 248. Flexible mount 212 is formed in a generally circular shape.

The upper outer housing portion 210 of pump outer housing 202 is formed generally in an inverted bowl shape, having a top portion and side portions defining a considerable depth. Upper outer housing portion 210 has a generally cylindrical center section 260 with squared corners 262, 263. The periphery of the lower portion of squared corner 262 is designed to mate with the nose plate 232 of intake mouth 224. The periphery of the lower portion of squared corner 263 is designed to mate with the sealing plate 244 of cooling air mouth 238.

Pressurized air outlets 264 are defined in squared corner 263. The lower margin of the side portion of upper outer housing 210 has interlocking marginal lips 268 defined thereon. Interlocking marginal lips 268 are designed to mate with interlocking marginal grooves 215 formed on the margin of lip 214. Downwardly directed mounting posts 270 are designed to be brought into registry with connecting posts 219 formed in base 213. Upwardly directed screws (not shown) are passed through the central bore 220 of connecting post 219 and threaded into mounting posts 270 to effect the mating of upper outer housing portion 210 to lower outer housing portion 208.

Figure 14:
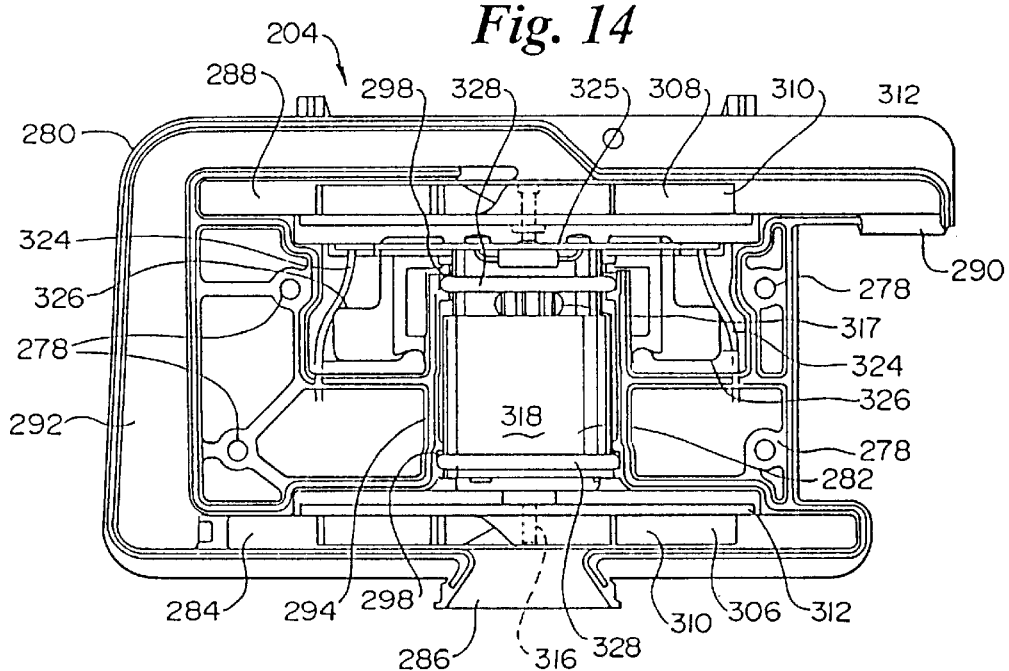
FIG. 14 is a sectional view taken from the perspective of line 14—14 of FIG. 13.

The fan unit 204 of pump 152 is best viewed in FIGS. 13 and 14 and has two major subcomponents: fan housing 280 and two stage fan 282. The fan unit 204 is preferably fully assembled prior to installation within pump housing 202. To facilitate such assembly, the fan housing 280 is formed in two halves 280a and 280b, enclosing the two stage fan 282. The sectional view of FIG. 14 depicts housing half 280a of housing 280 with the fan 282 installed therein. The two halves of fan housing 280 are held together by screws 276 threaded into supports 278.

Fan housing 280 has structure defining a lower impeller chamber 284. Lower impeller chamber 284 includes a central air inlet 286 defined therein. Central air inlet 286 is in fluid flow communication with a central chamber 223 of helical air intake passageway 222 when fan unit 204 is mounted to lower outer housing portion 208.

Upper impeller chamber 288 defines the second chamber for two stage fan 282. Upper impeller chamber 288 has an air outlet 290 designed to exhaust pressurized air from fan unit 204.

Lower impeller chamber 284 and upper impeller chamber 288 are fluidly connected by air passageway 292, designed to convey pressurized air from lower impeller chamber 284 to the upper impeller chamber 288.

A cylindrical core 294 is formed between lower impeller chamber 284 and upper impeller chamber 288. Core 294 has cooling air inlets 296 defined therein. Two O ring grooves 298 are formed around the inner diameter of core 294.

To facilitate the mounting of fan unit 204 to base 213, four mounting slots 300 are formed integral with the external portion of lower impeller chamber 284. Rubber mounting grommets 302 are inserted into mounting slots 300. Mounting grommets 302 have a central bore defined therein that is brought into registry with the central bore 218 of support posts 216.

Figure 15:
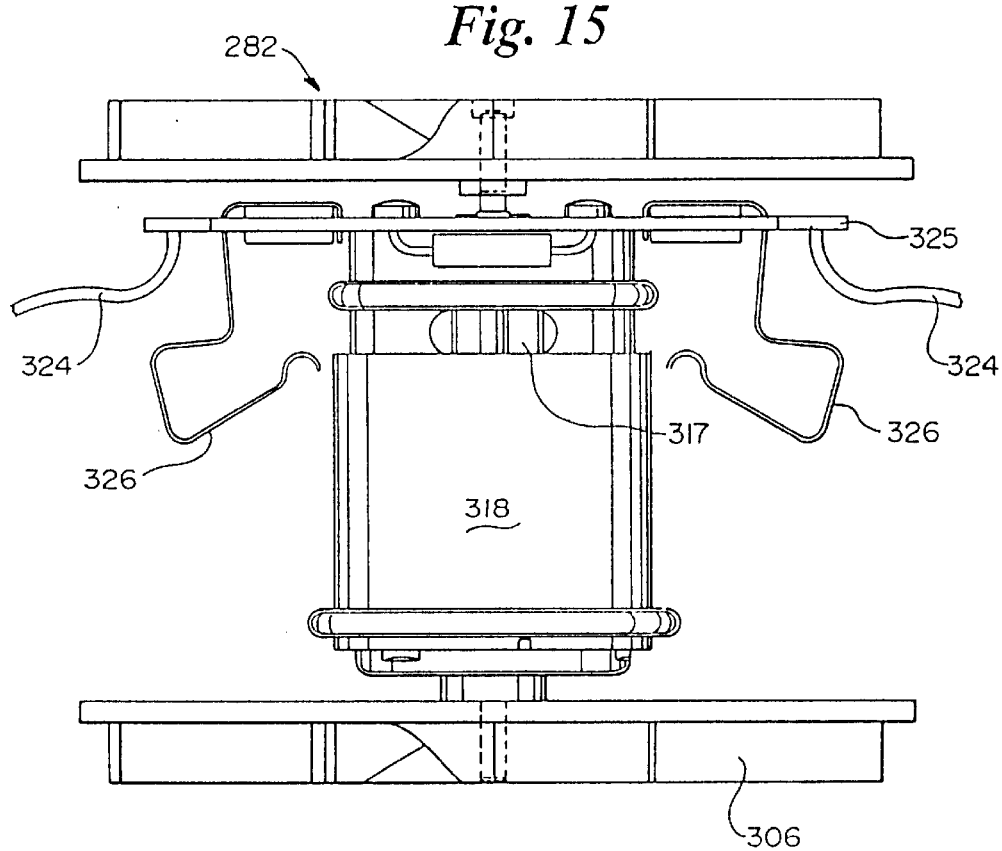
FIG. 15 is a side elevational view of the fan of the fan unit.
Figure 16A:
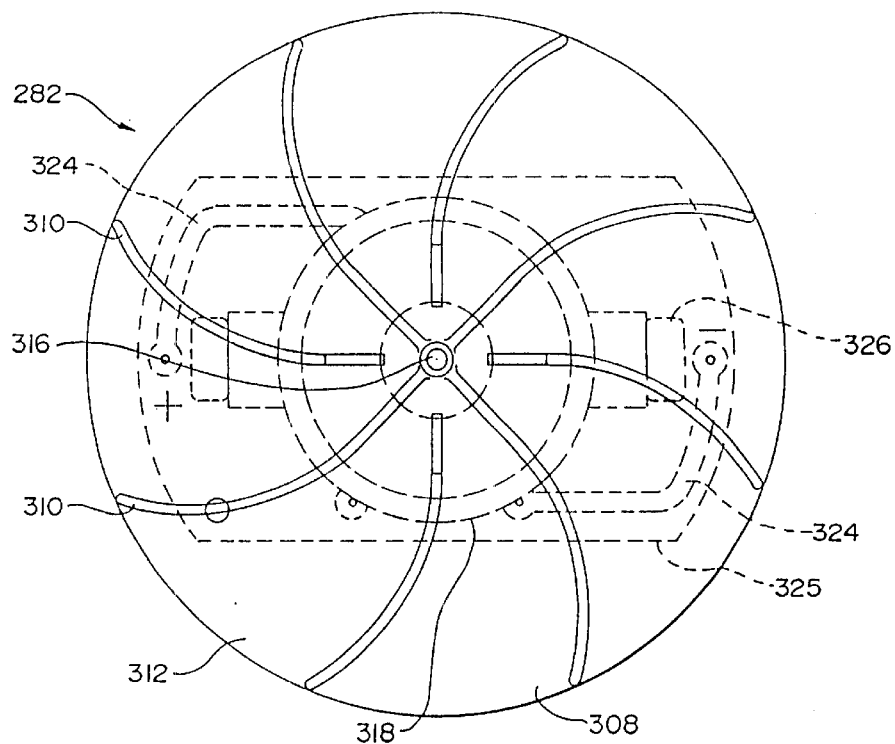
FIG. 16A is a top plan view with phantom lines depicting the power board beneath the impeller.

Referring to FIGS. 14, 15 and 16A, the two stage fan 282 of fan unit 204 is a variable speed unit designed to operate at various selected speeds. Fan 282 has a first stage impeller 306 and a second stage impeller 308. First stage impeller 306 is rotationally mounted within lower impeller chamber 284 and second stage impeller 308 is rotationally mounted in upper impeller chamber 288.

The impellers 306, 308 are mirror images in construction and have curved impeller vanes 310 mounted on an impeller disk 312. Preferably, there are eight radially directed curbed impeller vanes 310 on each impeller 306, 308.

The fan motor 314 is mounted on an axially shaft 316 extending between first stage impeller 306 and second stage impeller 308. A small cooling fan 317 is mounted on axially shaft 316.

The motor 314 is mounted within housing 318. Two cooling air inlets 320 are formed within housing 318 to admit cooling air to cooling fan 317. Cooling air outlets (not shown) are formed in the bottom portion of housing 318 approximate first stage impeller 306. Power leads 324 are brought into the top portion of housing 318 in order to power motor 314, by means of a power board 325. Power board 325 is affixed to housing 318 and is stabilized within fan housing 280 by clips 326.

The two stage fan 282 is mounted within fan housing 280 by two O rings 328. The O rings 328 are compressively held within O ring grooves 298 of fan housing 280. No portion of the fan 282 is in physical contact with the fan housing 280. Accordingly, the two O rings 328 provide dampening of vibrations generated by the two stage fan 282, thereby minimizing the transmission of such vibrations to fan housing 280.

Figure 16B:
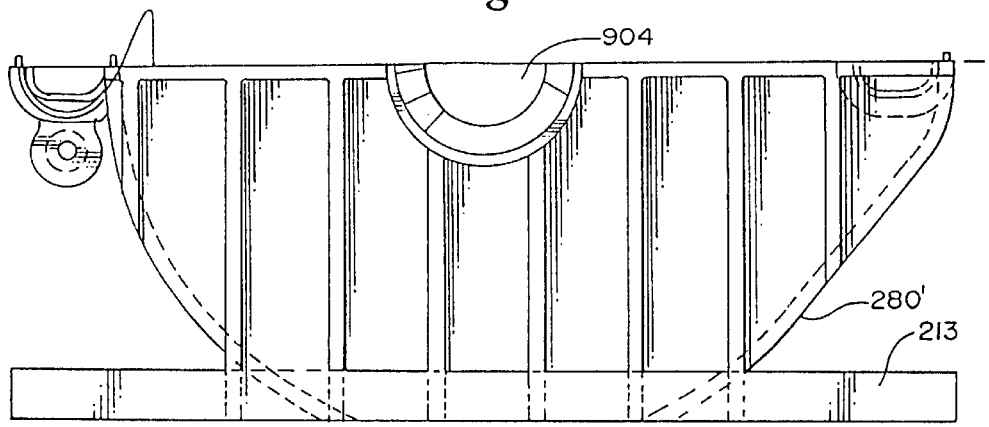
FIG. 16B is a schematic partial section view of a re-oriented pump housing and base.

Various modifications of pump 152 are possible within the scope of this invention. For example, it is possible to re-orient the motor 314 and impellers 306, 308 approximately 90° relative to base 213. FIG. 16B shows a side schematic view of a re-oriented partial (lower portion) fan housing 280' positioned above a schematic base 213'.

In this embodiment, at least one portion of housing 280 is removed to accommodate a secure contact with base 213'. This configuration results in air intake at inlet 904 after routing through base 213', and then routing of the air through the central chamber and impeller chambers substantially as described above.

The vertical rather than horizontal orientation of the fan housing 280' allows additional volume of space between housing 280' and an outer pump housing generally adjacent to air inlet 904. This is quite useful for placement of circuitry and electrical components for controlling the pump. However, the elimination of portions of the housing also re-shape the overall configuration of the pump outer housing as a smaller, more circular (in plan view) layout relative to the pump 152 shape and size described in relation to FIG. 5.

FIG. 16C further illustrates air chamber modifications to improve the efficiency of air being pressurized within housing 280'. Lip 945, shown in shaded lines, is designed to route air in and out of the impeller chambers. However, this lip has been improved by lengthening to a new shape designated 946. Lip 946 more efficiently routes the air by extending further into the air flow.

A further air routing improvement is shown in FIG. 16C. This improvement is schematically similar to the lip extension in its utility with either the re-oriented pump shown in FIG. 16B or the pump 152 shown in various prior figures. Line 968 depicts the arc of rotation of an impeller within an impeller chamber. Line 970 depicts an inner wall of an impeller chamber, with the distance between the lines being less than about ¼", and more preferably about ⅛". The remainder of any previous chamber volume is preferably eliminated (as shown by diagonal lines 985). The overall reduction in chamber volume reduces wasteful vortices and improves the efficiency of pumps using this improvement.

Figure 18B:
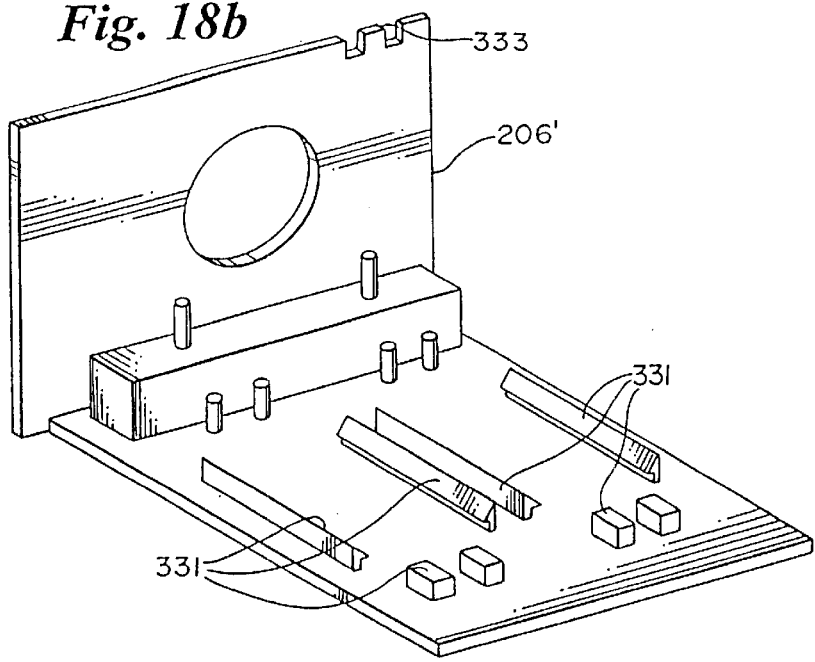
FIG. 18B is a perspective view of the inner portion of a snap-fit air distribution unit.
Figure 18C:
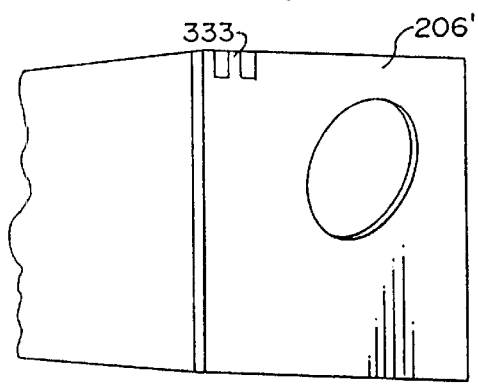
FIG. 18C is a partial perspective view of the outside of a snap-fit air distribution unit.
Figure 18D:
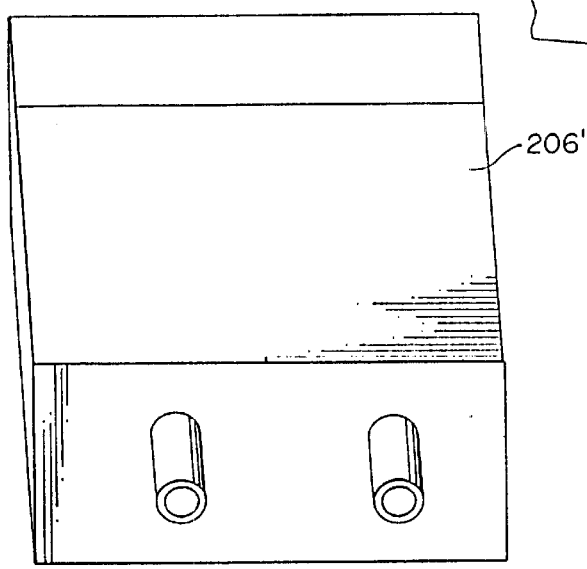
FIG. 18D is a partial top perspective view of the outside of a snap-fit air distribution unit.

Referring to FIGS. 10, 17 and 18A, the air distribution unit 206 of pump 152 is fixedly mounted on pump outer housing 202. The housing 330 of air distribution unit 206 is preferably made of a thermoplastic material and is conventionally coupled, in one embodiment, to fan housing 280 by screws. Alternate embodiment air distribution units 206', are shown in FIGS. 18B, 18C, and 18D. Air distribution unit 206' is designed for ease and economy of assembly by use of snap-in and snap-fit portions. These portions, such as solenoid retaining resilient fingers 331 and snap-fit portions 333, eliminate the need for assembly screws, thereby increasing assembly speed. Precise manufacturing of embodiments as shown in FIGS. 18B–18D further enhance the overall quality and competitiveness of products manufactured according to this invention.

Air distribution unit 206 has a pressurized air inlet 332 that is fluidly coupled to the air outlet 290 of upper impeller chamber 288. Air distribution system 206 further includes a left pressurized air outlet 334 and a right pressurized outlet 336. The left pressurized outlet 334 is connected to a flexible conduit 337a and flexible conduit 337a is connected to a pressure sensor 156. The right pressurized air outlet 336 is similarly connected to conduit 337b which is connected to pressure sensor 158. Left pressurized outlet 334 is in fluid communication with tube 166 which is in free pressure communication with a first air bladder 30 of the mattress unit 14. The right pressurized outlet 336 is similarly connected to a second air bladder 32 by way of tube 168. The pressurized air flow to the aforementioned two bladders 30, 32 is controlled by a left solenoid valve 338 and right solenoid valve 340. Air flow proceeds through the solenoid valves 338, 340 through inlet receptacles 170, 172 into tubes 166, 168 to achieve air communication with the air bladders 30, 32. Actuation of valves 338, 340 withdraws the solenoid shaft 341, thereby opening the inlet receptacles 170, 172.

In assembly, flexible mount 212 is first placed upon base 213 of lower outer housing portion 208. Flexible mount 212 is positioned with respect to intake mouth 224 and cooling air mouth 238 such that air entering intake openings 225a, 225b is directed beneath flexible mount 212 and air entering cooling air intake 240 is directed above flexible mount 212.

Fan unit 204 is then placed on top of the foam rubber cushion 250 of flexible mount 212. Suitable screws 348 are passed through the central bores 218 of support posts 216 and are threadedly engaged with rubber mounting grommets 302 that are in the mounting slots 300 of fan housing 280. As these screws are tightened, the fan unit 204 is pulled into compressive engagement with the foam rubber cushion 250 of the flexible mount 212. The rubber mounting grommets 302 come into compressive engagement with the support posts 216. By this means, the fan unit 204 is held in fixed engagement with the lower outer housing portion 208 of pump outer housing 202. At the same time, vibrations generated within fan unit 204 are damped by the foam rubber cushions 250 of flexible mount 212 and the rubber mounting grommets 302. Accordingly, the transmission of vibrations from fan unit 204 to lower outer housing portion 208 of the pump outer housing 202 is minimized. The upper outer housing portion 210 of pump outer housing 202 may then be installed over the fan unit 204 and air distribution unit 206 without the physical contact therewith.

The service unit (not shown) performs all of the function of a hand control unit 42 in addition to various diagnostic checks of the base unit 44.

Operation of the Base Unit Air Pump

In operation of the base unit air pump 152, air is drawn in through intake opening 225a, 225b to helical air intake passageway 222. Fan noise being transmitted out through a straight line air intake was a source of noise in conventional air pumps. In contrast, the helical air intake passageway 222 acts to minimize the transmission of fan noise therethrough.

The air is drawn from central chamber 223 of the helical air intake passageway 222 through air inlet 286 and lower impeller chamber 284. The air is pressurized and accelerated by the rotating of first stage impeller 306. Such pressurized air is then forced through air passageway 292 to the upper impeller chamber 288. The air is then further pressurized by the rotating second stage impeller 308. The pressurized air is expelled from fan housing 280 via air outlet 290 to the air distribution unit 206. The air distribution unit 206 then distributes pressurized air to one or both of the air chambers of the air bed as determined by the left solenoid valve 338 and right solenoid valve 340.

Cooling air is drawn in through the cooling air intake 240. The cooling air floods the space defined between the upper outer housing portion 210 of pump outer housing 202 and the fan unit 204. The cooling air is drawn by cooling fan 317 through the cooling air inlet 296 and into the housing 318 of the two stage fan 282. The cooling fan 317 forces the cooling air downward through motor 314 of the two stage fan 282 and out through the cooling air outlet 320. The cooling air outlets open into the upper impeller chamber 288. The cooling air is then pressurized by the first stage impeller 306 and mixed with the air received from central air inlet 286. The cooling air is then provided to the air bed via the air distribution unit 206. The foregoing cooling air path acts to minimize the transmission of fan vibration and noise therethrough.

Operation of the Air Control System

The function of the air control system 40 relies on the communication link between the base unit 44 and the hand control unit 42. Communications are always initiated by either a hand control unit 42 or a service unit. A base unit 44 transmits only in response to messages it receives from the other units. A preamble to the message provides a sequence during which the receiver can synchronize with the transmitter. A preferred preamble consists of 14 zero bits followed by 2 one bits.

Every message contains a 8-bit ID field which indicates the originator or addressee of the message, a 4 bit revision code which indicates the version of the software and a four bit instruction. Hand control units 42 place their particular ID into messages that they send. All service units put the same ID, all zeros, and revision code, all zeros, into the messages that they send. The 8 bit ID allows for 256 different IDs for the hand control units 42 with the one reserved for service units. The 4 bit revision code allows for 16 different software versions, and the 4 bit instructions allow for 16 different messages. It requires about 1200 microseconds to transmit each bit.

A base unit 44 responds to messages only from service units or from hand units 42 that it recognizes. A base unit 44 puts the destination unit's ID in the response message. A base unit 44 maintains a list of hand unit IDs that it recognizes, up to two. The list can be entered by any hand control unit 42 during the first 256 secs. after the base unit 44 is powered on. This facilitates the initialization of the list of recognized hand control units 42. If there is a power outage or the base station is unplugged, previously entered IDs will be remembered by the base unit 44, and reinitialization will not be required. Also, the hand unit introduction procedure, described below, can be used by a recognized hand control unit 42 whenever the base unit 44 is not busy with an adjustment. The hand unit introduction procedure completely rewrites the list of recognized hand control unit IDs.

Figure 19A:
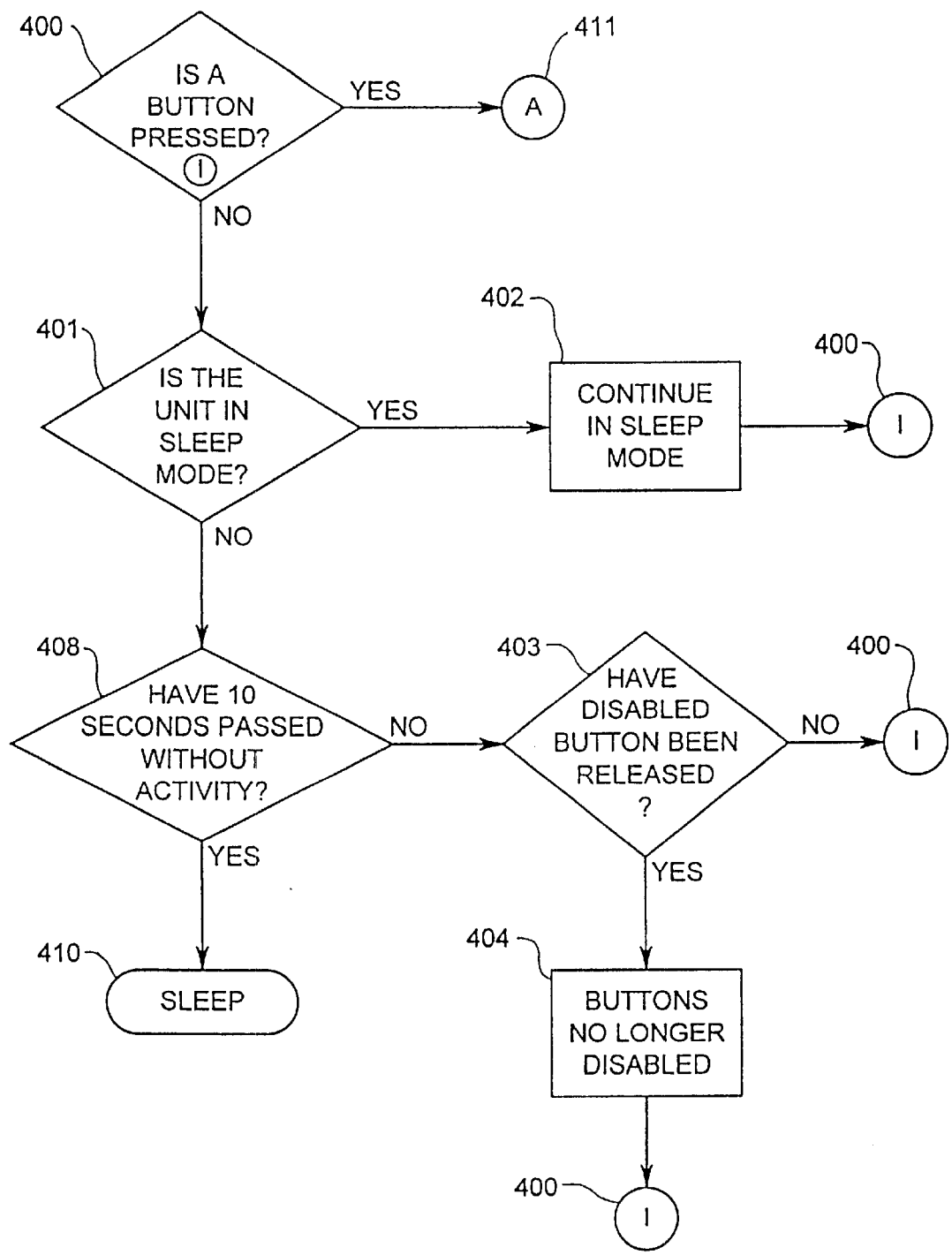
FIGS. 19a–19c are flow diagrams depicting the processing steps of the hand control processor upon pressing one or two buttons.

The hand control processor 118 responds basically to the pressing of one or both buttons 106, 108. Referring to FIG. 19a, if the hand control processor 118 determines that neither button 106, 108 is being pressed at step 400, the hand control processor 118 determines whether the unit is currently in the sleep mode or not at step 401. If it was in the sleep mode, the hand control unit 42 continues in the sleep mode 402. If it was not in the sleep mode at step 401, the hand control processor 118 next determines whether 10 seconds have passed without activity at step 408, as depicted in FIG. 19a. The buttons 106, 108 are checked every tenth of a second. If 10 seconds have passed without activity, step 408 proceeds to step 410 where the digital display 104 is turned off, and the hand control unit 42 enters the sleep mode to conserve power. If 10 seconds have not passed without activity, the hand control processor 118 checks at step 403 if buttons had been disabled and the disabling condition has been removed. If there were disabled buttons, the buttons are freed from being disabled at step 404, and the processor continues with step 400. If at step 403, it is determined that no buttons are disabled, the hand control processor 118 continues with step 400.

Figure 19B:
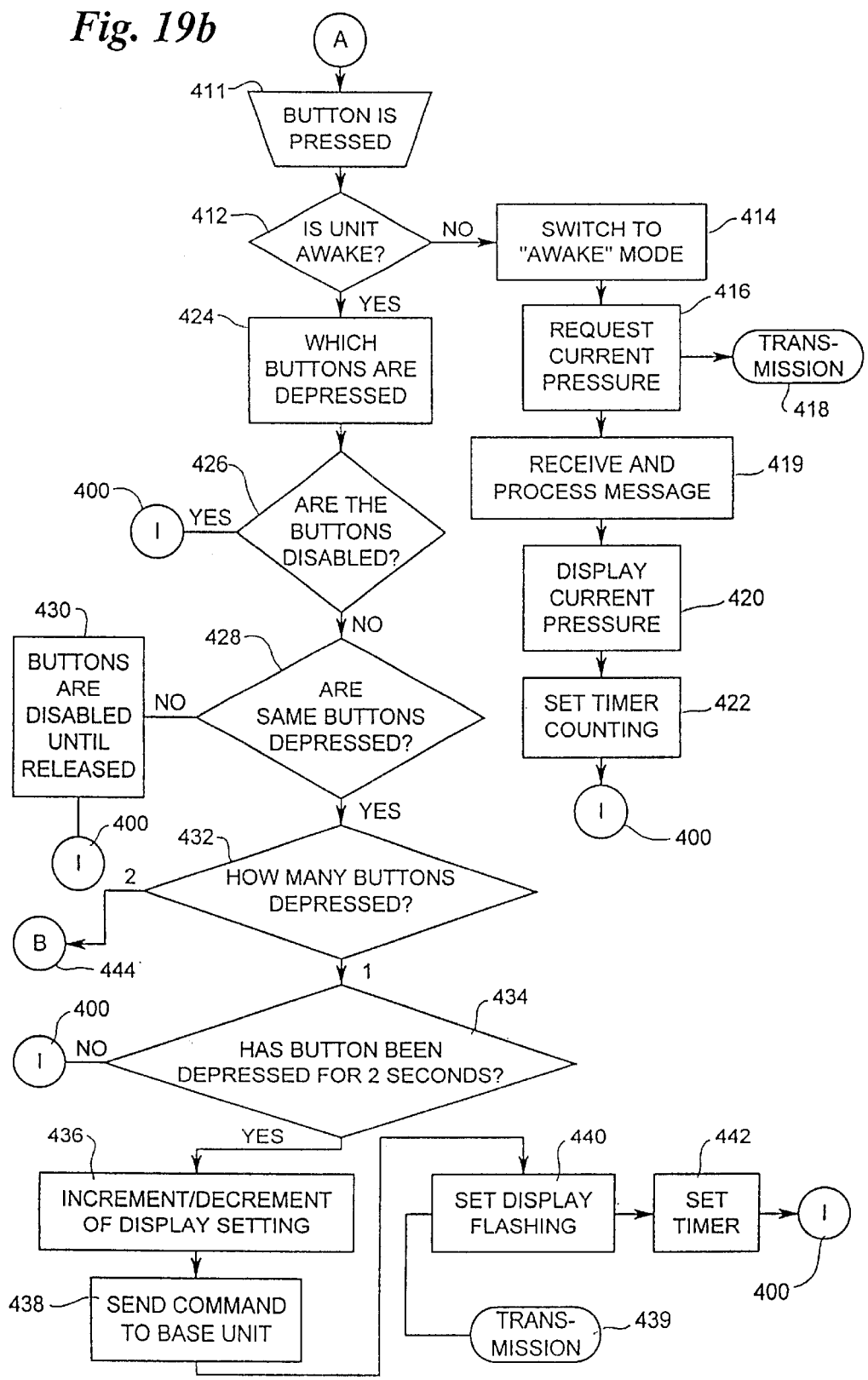

Referring to FIG. 19b, if the hand control processor 118 determines that a button 106, 108 is being pressed at step 400, the hand control processor 118 initiates the processing of the signal from the buttons 411. First, it is determined whether the control is in its active state at step 412. If the hand control unit 42 was in sleep mode when the button 106, 108 was pressed, it switches to wake-up mode (step 414). At wake up 414, the hand control unit 42 zeros its RAM memory, turns on the power to the display 104 and initializes much of the rest of the system.

After a wake-up mode is initiated at step 414, the hand control processor 118 requests the current pressure 416 from the base unit 44 by way of the hand control transmitter/receiver 120 at step 418. to show a pressure measurement sampled within the last 30 seconds. A response from base unit 44 is received and decoded 419, and the display 104 is updated 420. Then, the hand control processor 118 sets a timer counting 422, and returns to determine again if a button 106, 108 is depressed 400 when the appropriate time to check the buttons is reached. The value from the timer can be used for the later determination of how long the button has been depressed.

If at step 412 the hand control unit 42 was in an awake mode, it is determined which buttons are depressed at step 424. To make this determination, the hand control unit 42 reads the buttons 106, 108, every tenth of a second and updates a byte that shows which buttons are pressed. The relatively slow sampling rate provides an effective means of debouncing the buttons. After determining which buttons are depressed at step 424, the hand control processor 118 determines if the buttons are disabled 426. If the buttons are disabled at step 426, the program continues with step 400. If the buttons are not disabled, the program continues with step 428. The hand control processor 118 keeps track of the buttons 106, 108 that were pressed on the previous reading. It is then determined if the same buttons are depressed which had been depressed at the last determination 428. If different buttons are depressed, the buttons are disabled at step 430, and they remain disabled until released, see step 403. The program then continues with step 400. Buttons are also disabled when an adjustment is active (not shown).

After determining that the buttons are not disabled at step 428, it is determined how many buttons are depressed 432. If one button is depressed at step 432, it is determined if the button has been depressed for two seconds 434. If not, the program continues with step 400. If yes, the digital display 104 is incremented or decremented appropriately depending on which button 106, 108 is depressed 436. Initially, an increment or decrement is processed every 0.5 secs. that the button is held, but after four consecutive actions the rate is accelerated to an increment or decrement every 0.1 secs.

Also, the hand control processor 118 sends a message 438 that is transmitted 439 to base unit 44 to begin an adjustment of the pressure. To indicate that an adjustment is in progress, the digital display 104 is made to blink 440. Then, the hand control processor 118 resets the timer counting the length of time that the button has been depressed 442, and the program returns to step 400.

Figure 19C:
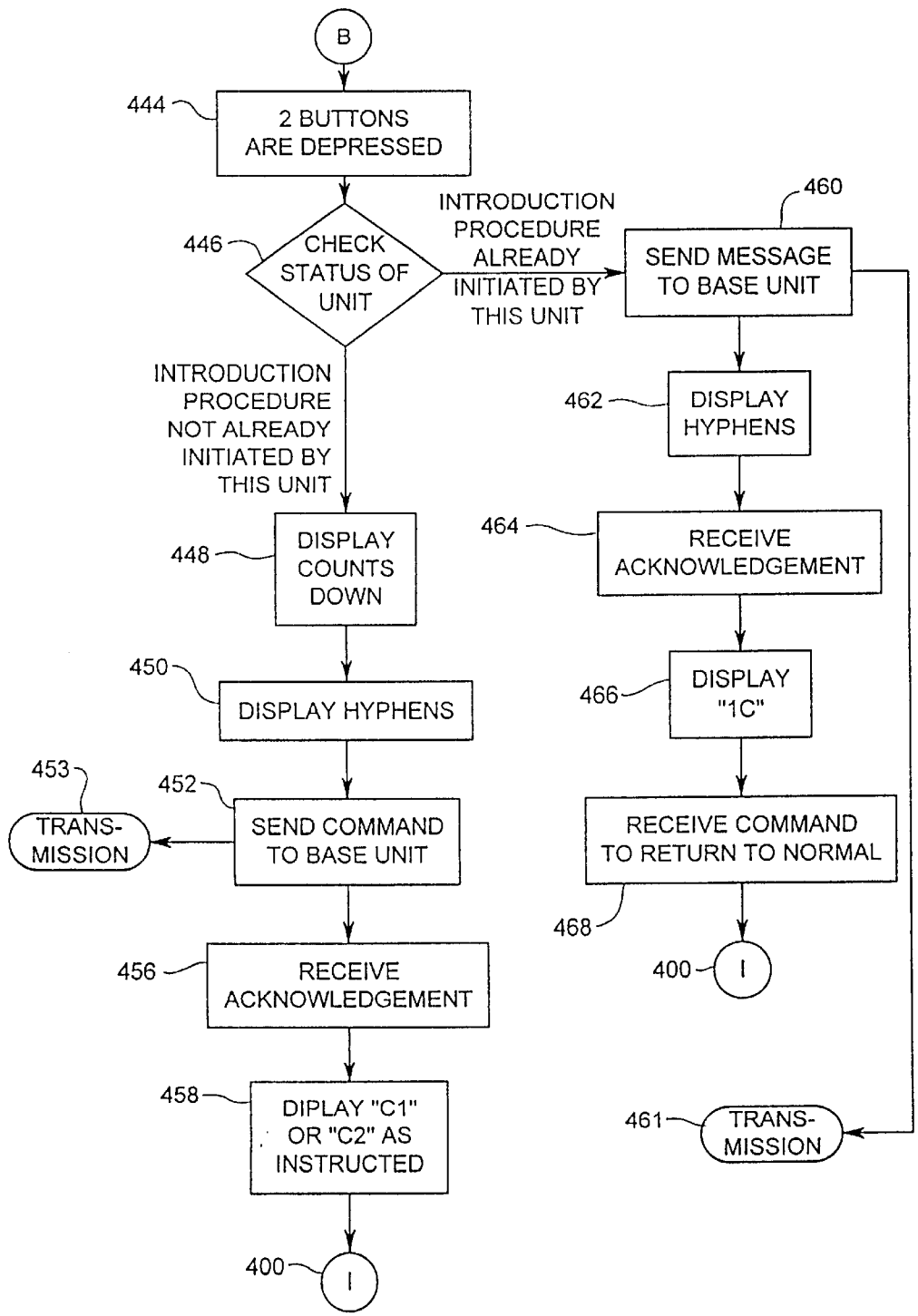

If step 432 determines that two buttons 106, 108 are depressed 444, the hand unit processor proceeds as is depicted in FIG. 19c. First, the status is checked 446, and the hand unit introduction procedure is initiated if it is not already in progress. This procedure is purposely cumbersome in order to prevent accidental modification of the list of recognized hand control units 40. Upon pressing both buttons, the display starts to count down at step 448 from 10 to 1. Then the display shows two hyphens ( - - ) 450, and the hand control unit 40 sends a message 452 which is transmitted 453 to the base unit 44. When the base unit 44 receives the message, it rewrites the ID list to contain only the ID of the sender hand control unit 42. Then the base unit 44 sends an acknowledgement to the hand control unit 42. When the hand control unit 42 receives the acknowledgement at step 456, it displays "C1" or "C2" at step 458 as instructed by the base unit 44.

After the first message is received by the base unit 44, the user has one minute to complete the hand unit introduction procedure. If the user wants the list to contain only one ID, there are two options. First, the user can press both buttons again, see step 444. This situation is depicted in the second branch in FIG. 19c for the case where the introduction procedure is already in progress. The hand control process 118 sends a message 460 that is then transmitted 461 to the base unit 44 that there is only one hand control unit 42. After the message is sent, hyphens are again shown on the display 462. The base unit 44 sends an acknowledgement that causes the display of the hand control unit 42 to display (1C) 466. A short time later, the base unit 44 sends an instruction for the hand control unit 42 to resume normal operation 468. Then, the hand control process 118 continues with step 400.

Alternatively, the user can do nothing for about one minute after "C1" is displayed at step 458. If the base unit 44 has not received a second message by the end of the minute, the base unit 44 sends a message that causes the hand control unit 42 to stop displaying "C1" and to return to normal operating mode. (This option is not depicted in the FIG. 19c since the hand control unit does not make the determination.)

If the user wants the list to contain two ID's, the user can go to the second hand control unit 42 and press both buttons step 444 within one minute while the first hand control unit 42 displays "C1". At step 446, the processing would proceed along the path where the hand control unit had not initiated the introduction procedure. The display of the second hand control unit 42 starts to count down 448 from 10 to 1. Then, the display of the second hand control unit 42 shows two hyphens ( - - ) 450, and the hand control unit 42 sends a message 452 to the base unit 44. When the base unit 44 receives this second message in the procedure, it adds the second ID to the list. Then, the base unit 44 sends an acknowledgement to the second hand control unit 42. When the second hand control unit 42 receives the acknowledgement 456, the display of the second hand control unit 42 shows "C2" 458. After a couple of seconds, the base unit 44 sends messages to both hand control units 42, causing them to stop displaying "C1" or"C2" and to return to normal operating mode. The hand unit introduction message is the only operation that elicits two responses from a base unit 44, the acknowledgement message and the done message.

With respect to the updating of the display buffers, the hand control unit software maintains two display buffers of three bytes each in its RAM memory. The secondary buffer contains information with each byte corresponding to a display digit 112 or half digit. Information in the primary buffer is organized according to the segments 113, 115 of the display 104.

When a base unit 44 is initialized to accept commands from two control units 42, conflicts can occur in two cases. The first conflict occurs if a hand control unit 42 tries to monitor an air bladder's pressure when the base unit 44 is already adjusting the pressure in the same air bladder 30, 32. The second opportunity for conflict occurs if a hand control unit 42 tries to adjust an air bladder's firmness when the base unit 44 is already adjusting the pressure in either air bladder 30, 32 in response to a request by another hand control unit 42. In either of these cases of conflict, the base unit 44 will notify the requesting hand control unit 42 that it is busy and cannot currently satisfy the request. This causes the second hand control unit to display blinking hyphens ( - - ).

When the second hand control unit 42, displays blinking hyphens, it ignores depression of the increment/decrement buttons 106, 108, i.e., the buttons are effectively disabled as long as a pressure adjustment is occurring under the instruction of the first hand control unit 42. The hand unit does check for changes in the two position switch 110. When the position of the two position switch 110 is changed, the hand control unit 42 notifies the base unit 44, and the base unit 44 transmits the pressure of the newly selected air bladder 30, 32 to the hand control unit 42 while not terminating the active adjustment of the other air bladder 30, 32 as instructed by the other hand control unit 42.

The digital display 104 will display various error codes in response to various communication difficulties with base unit 44 and if the motor 152 is too hot to make an adjustment.

Figure 20:
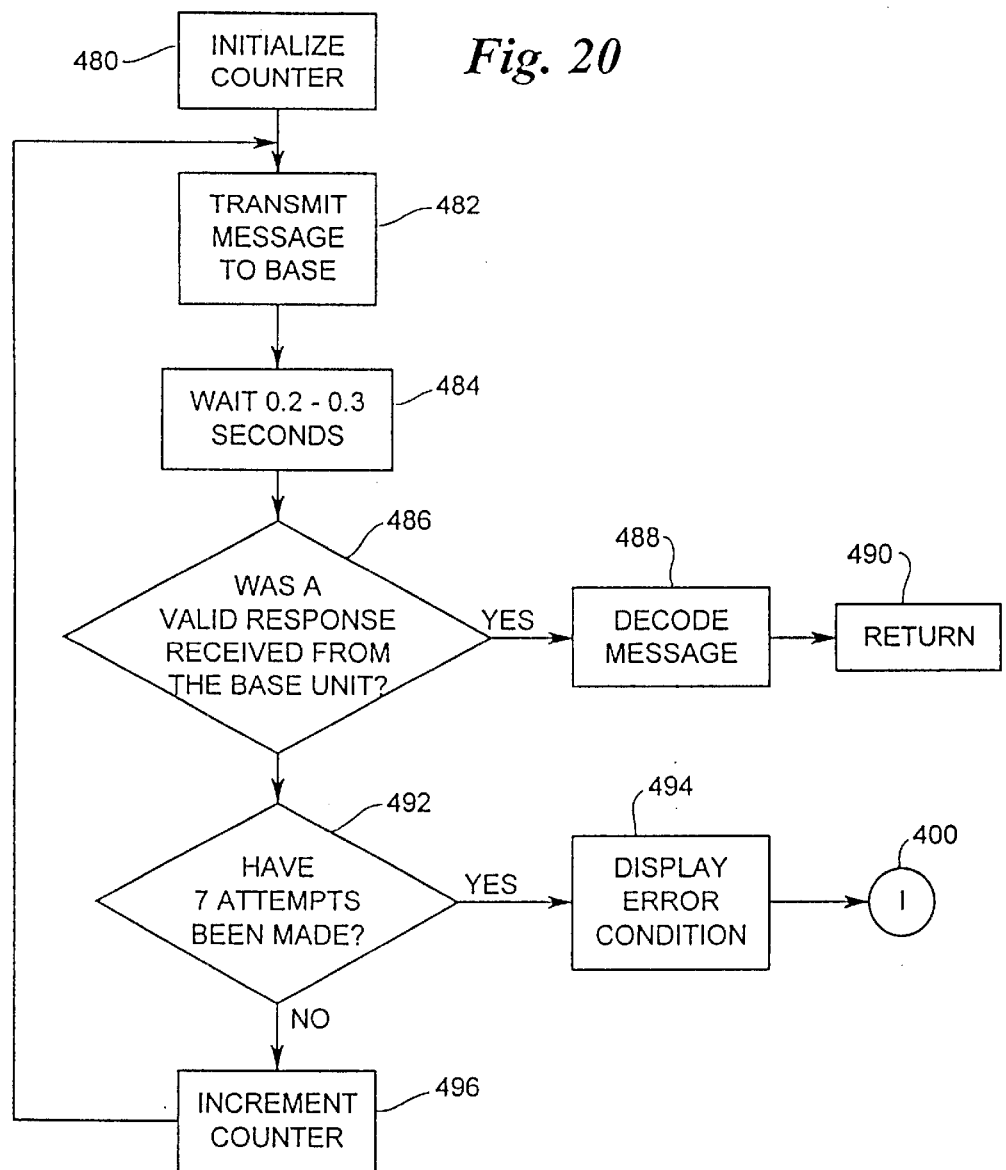
FIG. 20 is a flow diagram depicting the transmission sequence followed by the hand control processor.

FIG. 20 displays the process of receiving and decoding a message from the base unit. A counter is set to one 480, and a message is transmitted 482 to base unit 44. After waiting 0.2 to 0.3 seconds 484, hand control processor 118 checks 486 if a valid response was received from the base unit 44. If a valid response was received, the response is processed 488 and the processor returns 490 to the programming step awaiting the response. If a valid response was not received, the counter is checked to determine if 7 attempts at transmission have been made 492. If 7 attempts have been made, an error message is sent to the digital display 104 and the program returns to step 400. If 7 attempts had not been made at step 488, the counter is incremented by one 496, and the hand control process 114 returns to step 482 to continue with the transmission loop.

Figure 21:
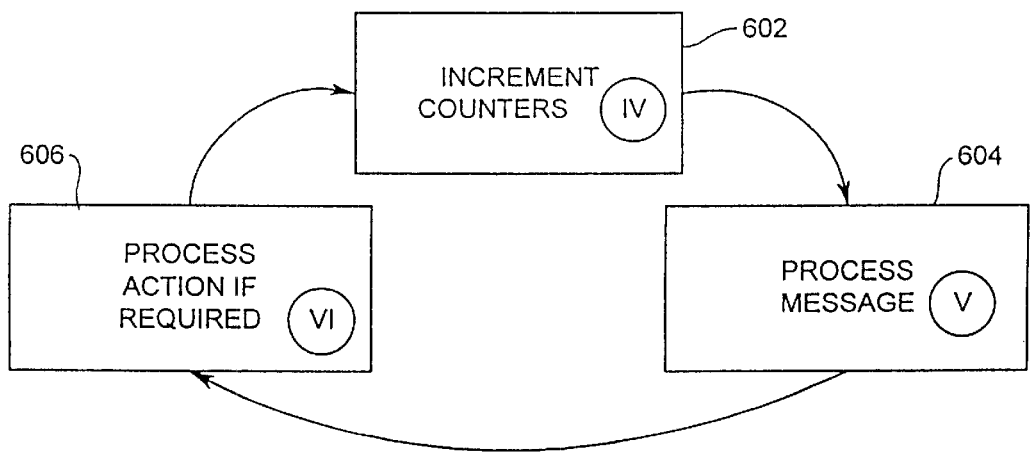
FIG. 21 is a flow diagram depicting the overall operation of the base processor.

The software for the base processor 162 has a main loop in which the processor spends most of its time. Referring to FIG. 21, the base processor 162 updates various timers if a second has elapsed since the last update 602, checks if a message has been received but not yet processed 604 and checks if a time dependent action needs to be formed 606. The base unit 44 responds only when instructed by a hand control unit 42 except for monitoring the pressure which occurs every 30 seconds if no other activity is taking place. The base unit 44 sends a response for every message received from a recognized hand control unit 42.

In order to reduce the chance of a base unit 44 taking an undesirable action because of an erroneously received message, the base unit 44 only accepts a message from a hand control unit 42 within 256 secs. of power up of the base unit 44 or within 256 secs. of the receipt of a previous acceptable message from the hand control unit 42, unless the message received is just requesting the current status. Similarly, base unit 44 only accepts messages from a service unit within five minutes of power up or within five minutes of receipt of a previous acceptable message from the service unit. As each byte is received, the message is stored in a reception buffer.

Figure 22:
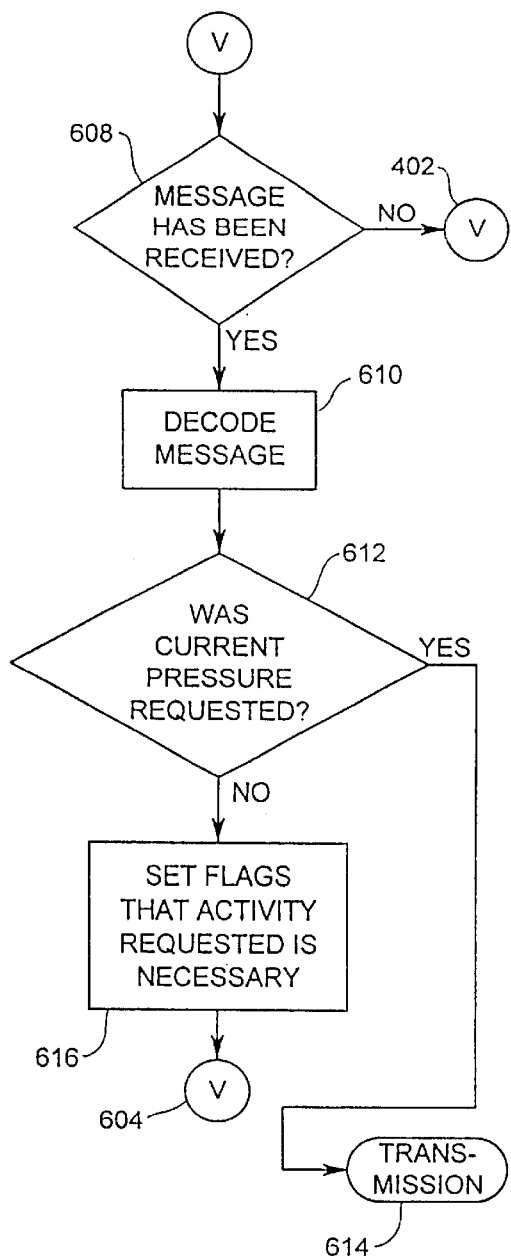
FIG. 22 is a flow diagram depicting the receiving and decoding of messages by the base processor.

At step 604, the processor determines if a message has been received 608 and is waiting for processing, see FIG. 22. If there is a message to be processed, the message is decoded 610. If the current pressure was requested 612, the pressure last measured is transmitted 614 to the hand control unit 42. If the message initiated a inflation/deflation request or the hand unit introduction procedure, the processor is notified 616 that an activity is requested, and the program returns to the main loop 604.

FIG. 23 depicts the various paths the base processor 162 can follow when a process action is required at step 606. If at step 606, the base processor 162 determines that an action is required 618, the processor proceeds to determine which action is required (see FIG. 19*a*): hand unit introduction in progress 620, pressure needs to be read 622, adjustment in progress 624, adjustment request is pending 626. A hand unit introduction procedure can be initiated by a recognized hand control unit 42 whenever the base unit 44 is not busy with an adjustment. The procedure can be initiated by any hand control unit 42 during the first 256 secs. after the base unit 44 is powered on.

Figure 23A:
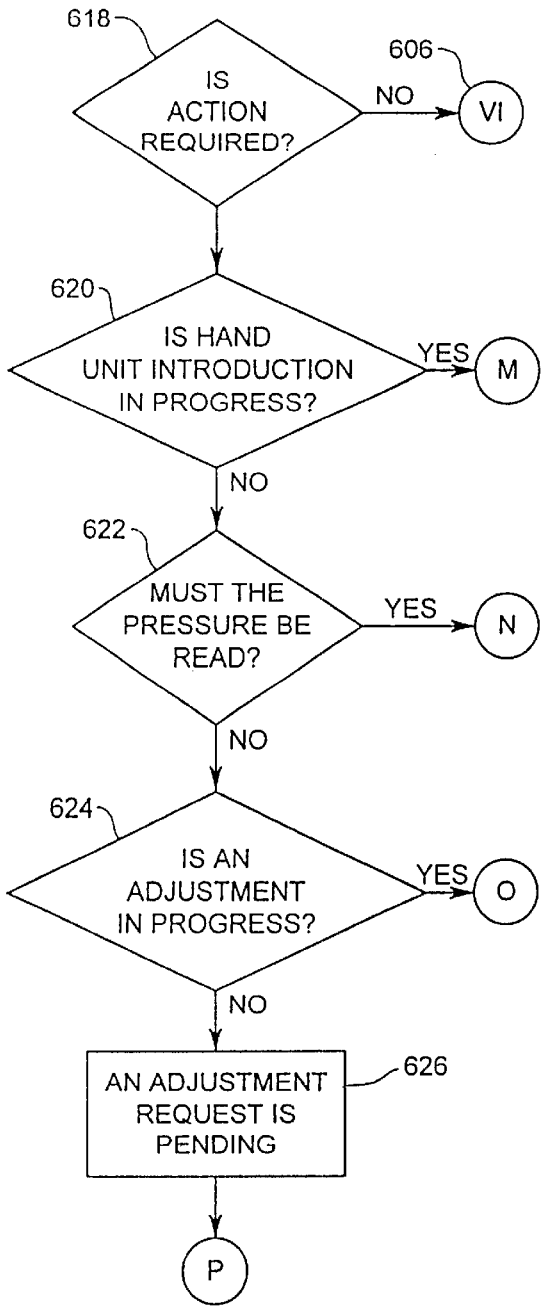
FIGS. 23a–23e are flow diagrams depicting the processing of time dependent actions by the base processor.
Figure 23B:
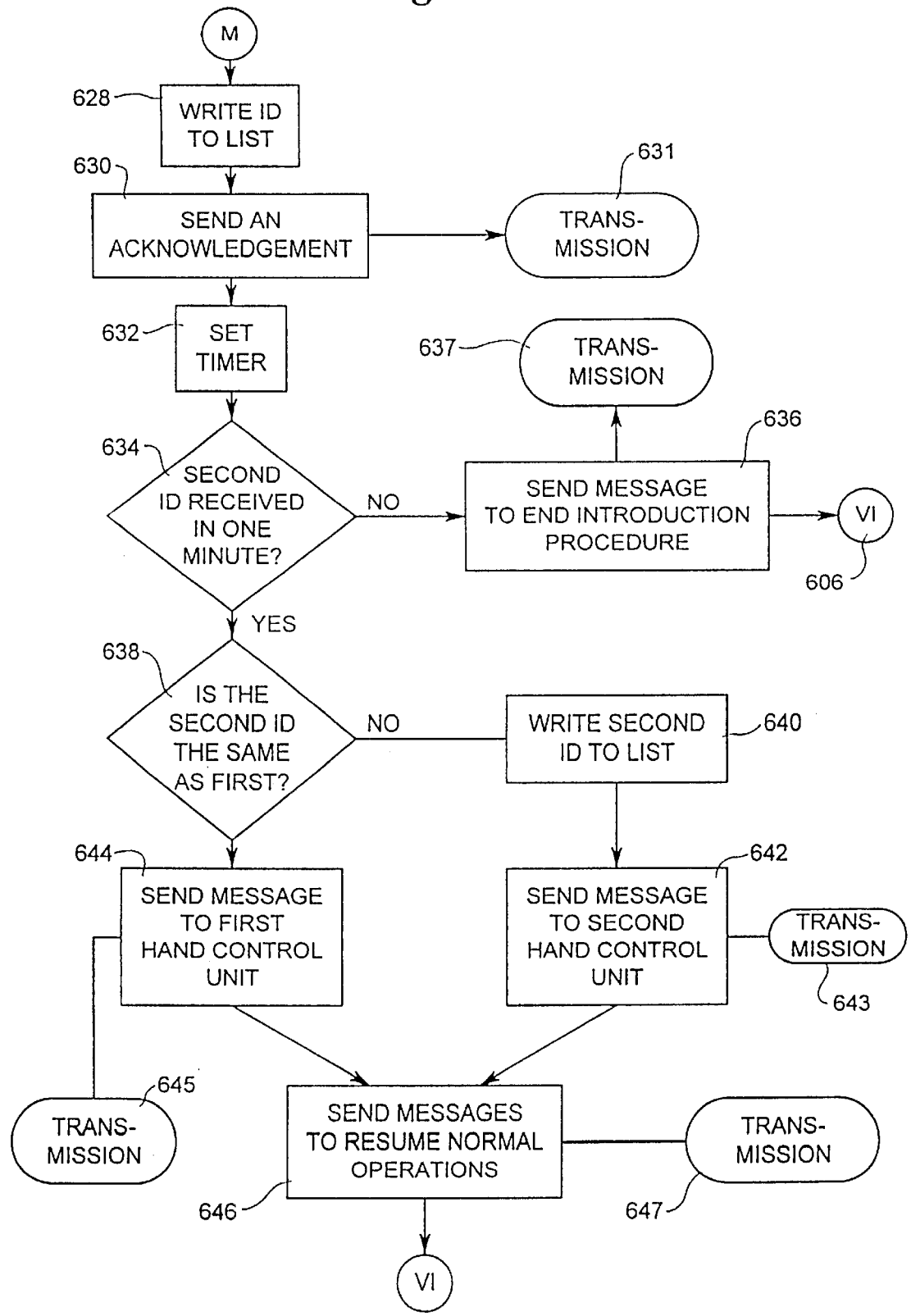

Referring to FIG. 23*b*, when the base unit 44 receives the first hand unit introduction message, the base processor 162 rewrites the ID list 628 to contain only the ID of the sender hand control unit 42. Then, the base unit 44 sends an acknowledgement 630 that is transmitted 631 to the hand unit 42. The base processor 162 sets a timer 632. The base processor 162 monitors the timer for one minute to determine 634 if a second hand unit introduction message is received. If no other messages are received within this minute, the base processor 162 concludes that there is only one hand control unit 42, sends a message 636 to return to normal operation that is transmitted 637 to the hand control unit 42, and the base processor 162 ends the hand unit introduction procedure and returns to the main loop 606.

When the base unit 44 receives a second hand unit introduction message within one minute of the first, the base processor 162 determines 638 if the ID is the same as the first ID received. If the second ID is different, the base processor 162 adds the second ID to the list of IDs 640. Then, the base unit 44 sends a message 642 that is transmitted 643 to the second hand control unit 42. If the second message originated from the same hand control unit 42 as the first message, the base unit sends a message 644 that is transmitted 645 to the hand control unit 42 acknowledging that there is only one hand control unit 42. In either case, after a couple of seconds, the base unit sends a message 646 that is transmitted 647 to the one or to both units to return to normal operation.

Figure 23C:
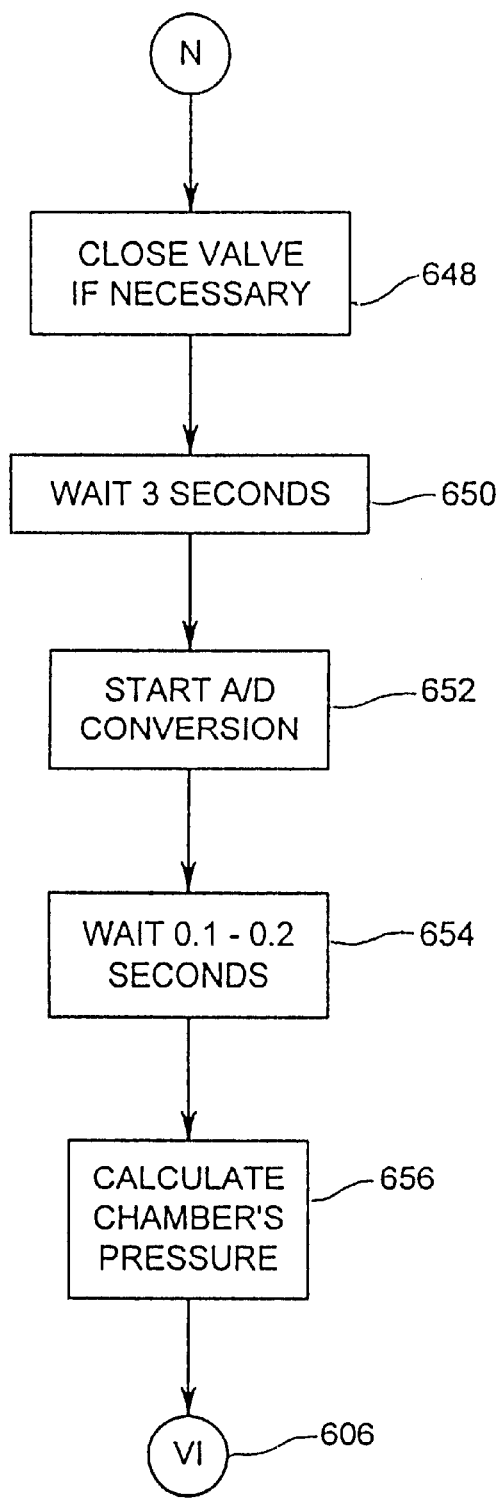
Figure 23D:
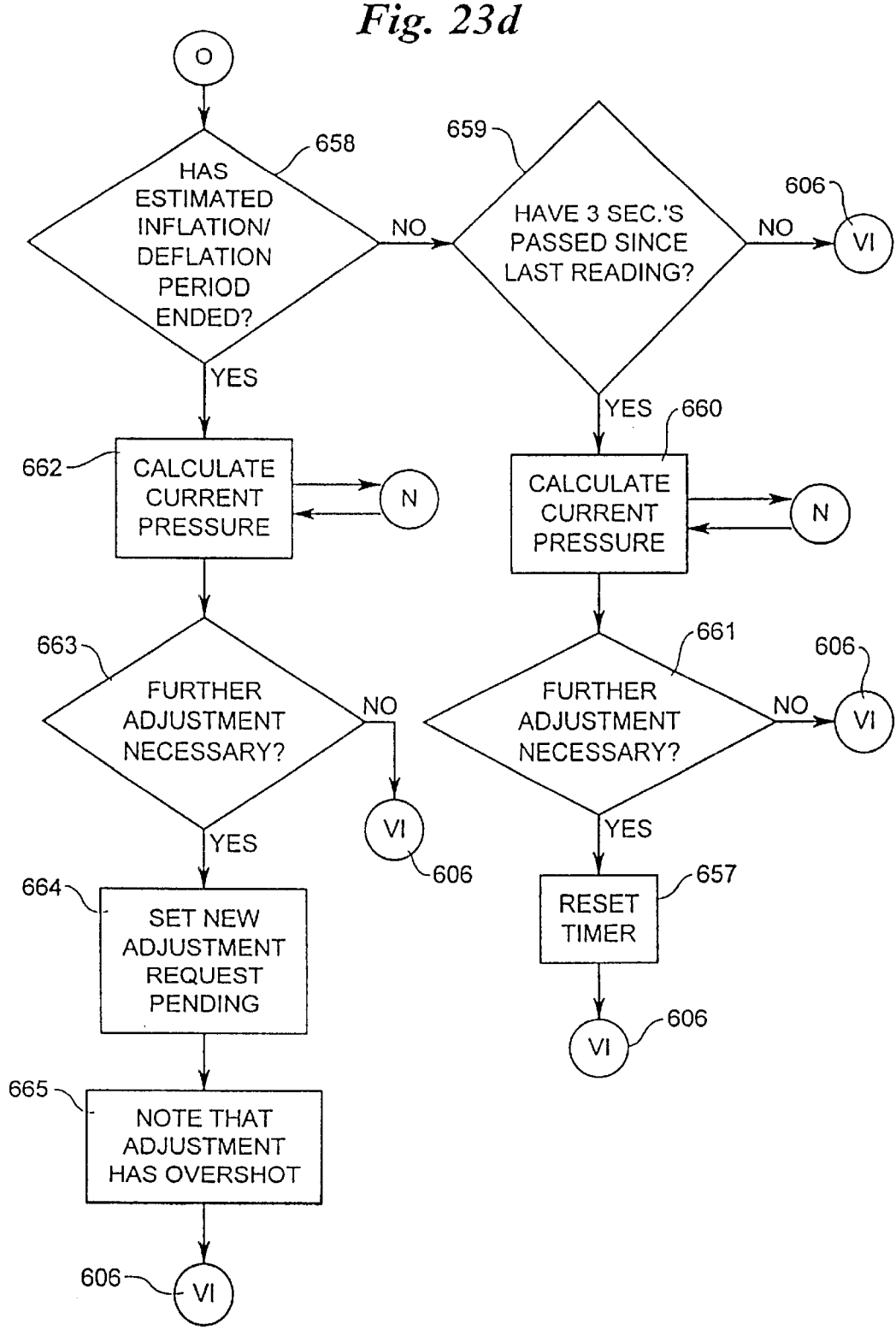

The pressure is read every 30 seconds if no adjustment is taking place. As described below, the pressure is also read every 3 seconds during an active adjustment. Note that during an active adjustment, the hand control unit 42 sends a request for the pressure every 10 secs. while continuing to display the flashing target pressure. At each request, the base unit 44 transmits to the hand control unit 42 the last pressure read as in step 612. Referring to FIG. 23*c*, to read the pressure, the base processor 162 first closes 648 the valves 338, 340 if necessary. Three seconds are allowed to pass 650 to let the pressure in the air bladders 30, 32 to stabilize. The base processor 162 then initiates the analog-to-digital (A/D) conversion 652 of the output of the pressure sensors 156, 158. Then, the base processor 162 waits 0.1–0.2 second 654 before calculating the pressure 656 from the digitized reading. The pressure is obtained from the following formula:

Pressure=Gain*(Reading−Offset)

where the Gain and the Offset are determined when the unit is calibrated during manufacture or service. The values for Gain and Offset are stored in the base processor's memory. The calculated pressure is stored as a 24 bit number with a maximum resolution of 0.005 psi.

The actual number displayed by the hand control unit 42 can have various relationships to the pressure. It can be an actual expression of the pressure in appropriate units, or it can be a value scaled to some arbitrary and convenient units. This scaling can be linear or non linear. A preferred relationship between the display value and the pressure is

| Hand Controller Value | Pressure Value (psig) |
| --- | --- |
| 00 | <0.16 |
| 05 | 0.16 |
| 10 | 0.18 |
| 15 | 0.20 |
| 20 | 0.22 |
| 25 | 0.24 |
| 30 | 0.26 |
| 35 | 0.28 |
| 40 | 0.30 |
| 45 | 0.32 |
| 50 | 0.34 |
| 55 | 0.36 |
| 60 | 0.38 |
| 65 | 0.40 |
| 70 | 0.42 |
| 75 | 0.44 |
| 80 | 0.47 |
| 85 | 0.50 |
| 90 | 0.55 |
| 95 | 0.60 |
| 100 | 0.65 |

Alternatively, a linear relationship can be used between the displayed value and the pressure with zero pressure corresponding to a zero display and a maximum pressure of 0.65 psig corresponding to a displayed value of 100.

Referring to FIG. 3d, if an adjustment is in progress, the base processor 162 examines whether the estimated inflation/deflation period has ended 658. If it has not, the program check to see if 3 secs. have passed since the pressure has been measured. If 3 secs. have passed, the processor measures the pressure 660, as described above. The current pressure is compared with the requested pressure 662. If the calculated pressure is within 0.01 psi of the requested (target) pressure, the base processor 162 returns to the main loop 606 since no more adjustment will be undertaken. If the pressure is not within 0.01 psi of the requested pressure, the base processor 162 resets a timer to count 3 secs. and returns to the main loop at step 606. As an alternative to checking the pressure every 3 secs. during an active adjustment, the back pressure can be monitored with the valve 338, 340 open. This back pressure can be correlated by the manufacturer to correspond to a particular bladder 30, 32 pressure with the valve 338, 340 closed. Then, the pressure could be checked with the valve 338, 340 closed after the termination of the adjustment process to check the final value of the adjustment.

If the estimated inflation/deflation period has ended at step 658, the current pressure is calculated at step 662 by the procedure described above. Next, it is determined if further adjustment is necessary 663. If no further adjustment is necessary, the base processor 162 returns to the main loop 606. If it is determined that further adjustment is necessary at step 663, the base processor 162 sets a new adjustment request pending 664, and notes that the previous adjustment overshot 665 before proceeding with the main loop 606.

If the adjustment inflates too much and then deflates too much (or vice versa) three times in a row, the base unit terminates the adjustment, even if the current pressure is not within 0.01 psi of the requested pressure. Also, if the base reads an identical pressure of at least 0.35 psi while inflating a chamber, the base processor 162 determines that a "stall" condition exists and terminates the adjustment.

To reduce the chance that the motor 152 will overheat, the program for the base processor 162 implements a thermal model of the motor 152. The model assumes the following relationship of the temperature above ambient temperature with time:

$$T = T_{asympt} + C\, e^{(-kt)}$$

$T_{asympt}$ is dependent on the motor speed. k has a value of 0.002 when the motor is off and a value of 0.006 when the motor is on. For small steps in time, this equation leads to the following difference equation:

$$T(n+1) = T(n) + k*\Delta t*(T_{asympt} - T(n)),$$

showing the relationship between the temperature at time n, T(n), and the temperature at time n+1, T(n+1). When the motor 152 is off, the program uses a value of $\Delta t = 15$ sec. When the motor 152 is on, $\Delta t = 21$ sec.

If the program's thermal model estimates that the temperature exceeds 170 degrees above ambient temperature, the base processor 162 sets a flag in RAM, turns the motor on at low speed to facilitate cooling and refuses to begin another adjustment until the estimated (model) temperature drops below 120 degrees above ambient temperature. The valve 338, 340 will be closed during the cooling process unless the base processor 162 determines that a useful adjustment can be made with the valve 338, 340 open at the motor speed during cooling. When the temperature drops below 120 degrees, the program clears the flag and again accepts adjustment requests. If the flag is set when the base unit 44 is powered on, the base unit software initializes the temperature to 170 degrees above ambient, turns the motor on low speed to facilitate cooling and refuses to begin an adjustment until the estimated temperature drops below 120 degrees.

Figure 23E:
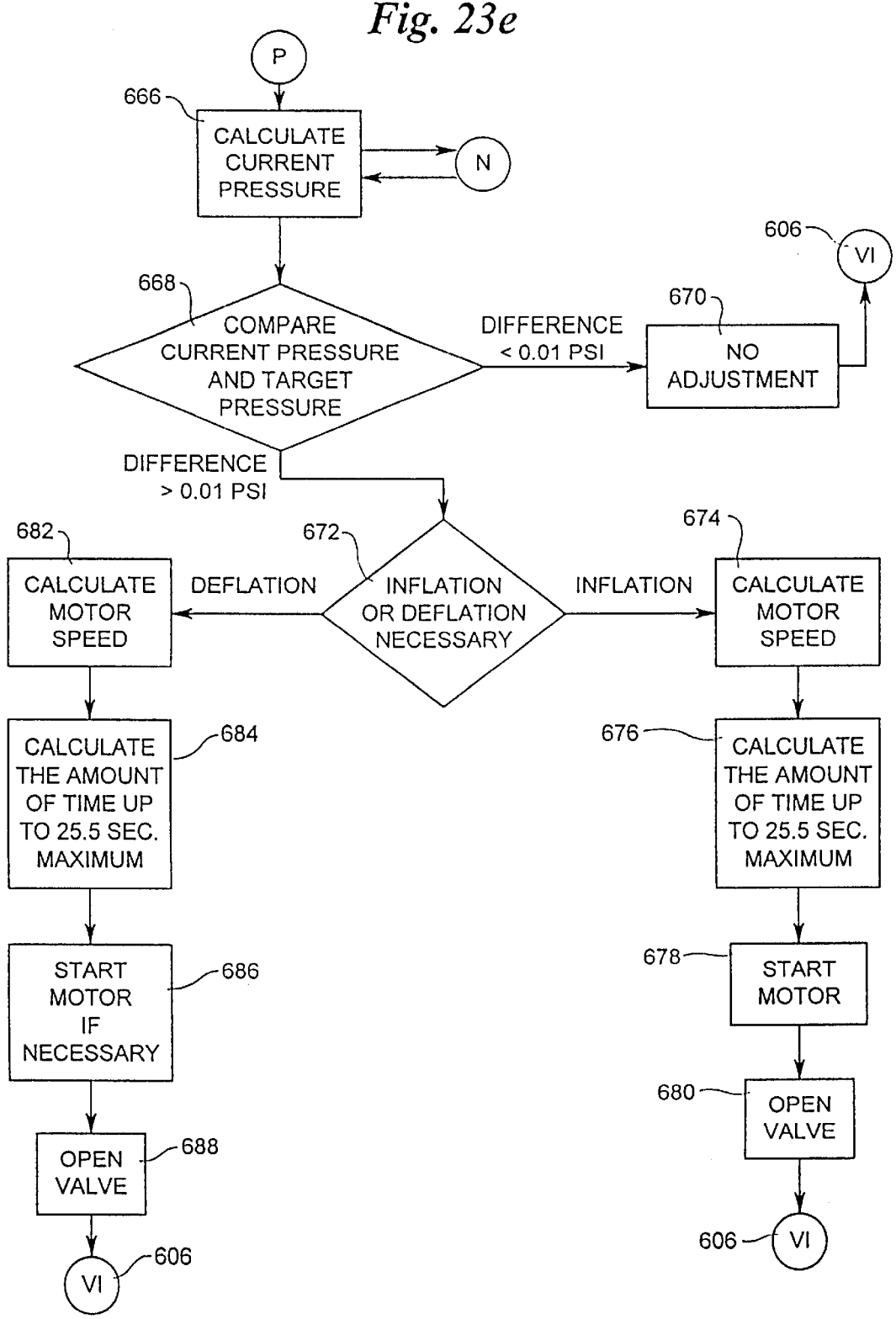

Referring to FIG. 23e, when the base processor 162 determines that an adjustment request is pending, first the current pressure is calculated at step 666, as described above. The current pressure is compared with the requested pressure 668. If the current pressure is within 0.01 psi of the requested pressure, no adjustment is necessary 670, and the program continues in the main loop 606. If the difference is greater than 0.01 psi, it is determined whether inflation or deflation is necessary at step 672.

If it is determined that inflation is necessary, the base processor 162 determines the appropriate motor speed 674. When inflating from pressures below 0.40 psig, the motor is run at medium speed. When inflating from greater pressures, the motor is run at high speed. The base processor 162 next calculates an estimate of the required time at step 676 up to a maximum of 256 secs. Also at this step, the number is stored in an 8-bit counter.

Then, the motorized pump 152 is started at step 678. Whenever the program turns on the motor for an adjustment, the motor is started at low speed with stepwise increases in the speed every two seconds until the required speed is reached. The motor is run at a total of five speeds. Low, medium and high are primary speeds, i.e. they are used as final target speeds. Low-medium and medium-high are used only to make the transitions between primary speeds more gradual and therefore, less audibly annoying. When the motor reaches the appropriate speed, the appropriate solenoid valve 338, 340 corresponding to the correct chamber is opened 680. With the adjustment in progress, the program returns to the main loop 606.

If it is determined that deflation is necessary, the motor speed is determined at step 682. When deflating from pressures below 0.40 psig, the motor is off. When deflating from greater pressures, the motor is run at low speed. Then, the base processor 162 calculates an estimate of the amount of time 684 required for the adjustment up to a maximum of 256 secs. The motor is started if necessary at step 686. When the motor reaches the appropriate speed, the appropriate solenoid valve 338, 340 corresponding to the correct chamber is opened at step 688. With the adjustment in progress, the program returns to the main loop 606.

When the base unit 44 is inflating an air chamber 30, 32, it reads the pressure about half a second after the valve is opened to measure the back pressure. Waiting a half second is necessary to obtain a stable back pressure reading. If the base processor 162 calculates a pressure of less than 0.15 psi, it determines that the base unit 44 is not connected to an air bladder 30, 32 and terminates the adjustment.

What is claimed is:

1. A control system useable to alter and maintain a pressure level in an inflatable bladder of an air bed comprising:

a fluid pump in fluid communication with said bladder and constructed and arranged to increase said pressure level therein when said fluid pump is energized;

a fluid relief valve in fluid communication with said bladder and constructed and arranged to allow fluid to escape from said bladder when said fluid relief valve is moved to an open position, thereby decreasing said pressure level in said bladder;

a pressure sensor positioned to measure said pressure level;

a hand held remote control capable of receiving input from a user representative of a preselected desired pressure level; and a processing board electronically coupled to said fluid pump, said relief valve, said pressure sensor, and said hand held remote control whereby:

said processing board comprises a memory bank containing pressure values assigned to predetermine numerals;

said processing board is constructed and arranged to receive data from said pressure sensor representative of said measured pressure level;

said processing board is constructed and arranged to receive data from said hand held remote control representative of said preselected desired pressure level;

said processing board is capable of computing the difference between said measured pressure level and said desired pressure level;

said processing board is capable of monitoring an amount of time elapsed since a user has operated said remote control;

said processing board is capable of opening said relief valve in the event that said measured pressure level exceeds said desired pressure level by a predetermined value and said amount of elapsed time has not exceeded a predetermined amount;

said processing board is capable of closing said relief valve when said measured pressure level is within a predetermined range of said desired pressure level;

said processing board is capable of energizing said fluid pump when said measured pressure level is below said desired pressure level by a predetermined value and said amount of elapsed time has not exceeded a predetermined amount; and said processing board is capable of stopping said fluid pump when said measured pressure level is within a predetermined range of said desired pressure level.

2. The control system of claim 1 wherein said fluid pump comprises an impeller pump.

3. The control system of claim 1 wherein said fluid pump comprises a positive displacement pump.

4. The control system of claim 1 wherein said pressure sensor is positioned between said fluid relief valve and said bladder.

5. The control system of claim 1 wherein said pressure sensor comprises a pressure transducer.

6. The control system of claim 1 wherein said hand held remote control is tethered to said fluid pump.

7. The control system of claim 1 wherein said hand held remote control comprises a wireless hand held remote control.

8. The control system of claim 1 wherein said hand held remote control comprises a transceiver.

9. The control system of claim 1 wherein said hand held remote control comprises a tether.

10. The control system of claim 1 wherein said hand held remote control comprises an analog display.

11. The control system of claim 1 wherein said hand held remote control comprises a digital display.

* * * * *

UNITED STATES PATENT AND TRADEMARK OFFICE
CERTIFICATE OF CORRECTION

PATENT NO. : 6,483,264 B1
DATED : November 19, 2002
INVENTOR(S) : David C. Shafer and Eugene P. Duval It is certified that error appears in the above-identified patent and that said Letters Patent is hereby corrected as shown below:

Column 3,
Line 33, delete the words "ba se" and insert -- base --

Column 9,
Line 1, delete the word "comer" and insert -- corner --

Column 17,
Line 47, delete the number "3d" and insert -- 23d --
Line 50, delete the word "check" and insert -- checks --

Signed and Sealed this

Eighth Day of April, 2003

JAMES E. ROGAN
*Director of the United States Patent and Trademark Office*